United States Patent
Wakimoto

(10) Patent No.: US 12,525,670 B2
(45) Date of Patent: Jan. 13, 2026

(54) BATTERY

(71) Applicant: Prime Planet Energy & Solutions, Inc., Tokyo (JP)

(72) Inventor: Ryoichi Wakimoto, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 986 days.

(21) Appl. No.: 17/678,927

(22) Filed: Feb. 23, 2022

(65) Prior Publication Data

US 2022/0271374 A1  Aug. 25, 2022

(30) Foreign Application Priority Data

Feb. 24, 2021 (JP) .................. 2021-027251

(51) Int. Cl.
| | | |
|---|---|---|
| H01M 50/131 | (2021.01) | |
| H01M 10/0587 | (2010.01) | |
| H01M 50/183 | (2021.01) | |
| H01M 50/531 | (2021.01) | |

(52) U.S. Cl.
CPC ..... *H01M 50/131* (2021.01); *H01M 10/0587* (2013.01); *H01M 50/183* (2021.01); *H01M 50/531* (2021.01)

(58) Field of Classification Search
CPC . H01M 10/0525–0587; H01M 50/131; H01M 50/183; H01M 50/531
See application file for complete search history.

(56) References Cited

U.S. PATENT DOCUMENTS

| | | |
|---|---|---|
| 2012/0160559 A1 | 6/2012 | Tsutsumi et al. |
| 2013/0034764 A1 | 2/2013 | Ochi et al. |
| 2014/0295220 A1 | 10/2014 | Mori et al. |
| 2015/0340663 A1 | 11/2015 | Minagata et al. |

(Continued)

FOREIGN PATENT DOCUMENTS

| | | |
|---|---|---|
| CN | 104078631 A | 10/2014 |
| CN | 104380500 A | 2/2015 |

(Continued)

OTHER PUBLICATIONS

CTC, What is clearance and creepage distance of insulation?, hyperlink https://www.powerctc.com/en/node/4757#:~: text=The%20minimum%20creepage%20needs%202.5,insulation%20must%20reach%205.0%20mm., Sep. 15. 2020 (Year: 2020).*

*Primary Examiner* — Jonathan G Leong
*Assistant Examiner* — Kan Luo
(74) *Attorney, Agent, or Firm* — HAUPTMAN HAM, LLP

(57) ABSTRACT

In an insulating sheet, a first left-side piece portion, a second left-side piece portion, a left-side bottom piece portion, a first left-side connection portion, and a second left-side connection portion form a first communication path for communicating inside and outside of the insulating sheet, the first communication path having a first open end at a position of an end of each of the first left-side connection portion and the second left-side connection portion on the opening side of an exterior package. The first communication path is located on a shortest reach path for an electrolyte solution reaching, from the outside of the insulating sheet, an end portion of an electrode assembly closest to a ridgeline portion of the exterior package on the bottom portion side and on the side of one of a pair of second side walls.

18 Claims, 14 Drawing Sheets

(56) References Cited

U.S. PATENT DOCUMENTS

| | | | |
|---|---|---|---|
| 2015/0357607 A1* | 12/2015 | Tsutsumi | H01G 11/66 |
| | | | 429/177 |
| 2017/0047616 A1 | 2/2017 | Takahata | |
| 2017/0133718 A1 | 5/2017 | Suzuki | |
| 2019/0036088 A1 | 1/2019 | Wakimoto | |
| 2022/0271374 A1 | 8/2022 | Wakimoto | |

FOREIGN PATENT DOCUMENTS

| | | |
|---|---|---|
| CN | 106233491 A | 12/2016 |
| CN | 106684423 A | 5/2017 |
| EP | 3134930 B1 | 5/2019 |
| JP | 2015-210892 A | 11/2015 |
| JP | 5811456 B2 | 11/2015 |
| JP | 2017-91792 A | 5/2017 |
| JP | 2019-029218 A | 2/2019 |
| JP | 201929218 A | 2/2019 |
| JP | 2019-121496 A | 7/2019 |
| JP | 2020-064793 A | 4/2020 |
| JP | 2022-128818 A | 9/2022 |
| WO | 2014002647 A1 | 1/2014 |

* cited by examiner

BATTERY

This nonprovisional application is based on Japanese Patent Application No. 2021-027251 filed on Feb. 24, 2021, with the Japan Patent Office, the entire contents of which are hereby incorporated by reference.

BACKGROUND OF THE INVENTION

Field of the Invention

The present technology relates to a battery.

Description of the Background Art

Japanese Patent Laying-Open No. 2019-29218 is a prior art document that discloses a configuration of a power storage device. The power storage device described in Japanese Patent Laying-Open No. 2019-29218 includes an electrode assembly, an insulating holder, and an exterior case. The insulating holder accommodates the electrode assembly. The exterior case accommodates the electrode assembly together with the insulating holder and the electrolyte solution. The insulating holder is formed by folding an insulating sheet. The insulating sheet is constituted of a plurality of sheet elements sectioned by a plurality of folds and a plurality of cuts.

SUMMARY OF THE INVENTION

When entry of water or the like in the vicinity of a battery causes a short-circuit path in which a high voltage is applied to be formed between batteries located at both ends of a series connection of a plurality of batteries, the high voltage may be applied between an electrode assembly and an exterior package inside a battery located on the short-circuit path, thereby causing partial discharge due to dielectric breakdown between the electrode assembly and the exterior package through a clearance between the electrode assembly and the exterior package, the clearance being formed by a cut of the insulating sheet.

The present technology has been made to solve the above problem and has an object to provide a battery in which occurrence of partial discharge between an electrode assembly and an exterior package can be suppressed.

A battery according to the present technology includes an electrode assembly, an exterior package composed of a metal, a sealing plate, and one insulating sheet. The electrode assembly has a positive electrode plate and a negative electrode plate. The exterior package has an opening through which the electrode assembly is insertable, and accommodates the electrode assembly and the electrolyte solution. The sealing plate seals the opening. The insulating sheet is disposed between the electrode assembly and the exterior package. The exterior package has a bottom portion, a pair of first side walls, and a pair of second side walls. The bottom portion faces the opening. The pair of first side walls are provided to extend from edges of the bottom portion and face each other. The pair of second side walls are provided to extend from edges of the bottom portion and face each other so as to connect between the first side walls. The insulating sheet includes a bottom surface portion, a first side surface portion, a second side surface portion, a first left-side piece portion, a second left-side piece portion, a left-side bottom piece portion, a first left-side connection portion, and a second left-side connection portion. The bottom surface portion faces the bottom portion. The first side surface portion is disposed between one of the pair of first side walls and the electrode assembly. The second side surface portion is disposed between the other of the pair of first side walls and the electrode assembly. The first left-side piece portion is folded from an end portion of one side of the first side surface portion, and is disposed between one of the pair of second side walls and the electrode assembly. The second left-side piece portion is folded from an end portion of one side of the second side surface portion, and is disposed between the one of the pair of second side walls and the electrode assembly to have at least a portion overlapping with the first left-side piece portion. The left-side bottom piece portion extends from an end portion of one side of the bottom surface portion, and is located between the one of the pair of second side walls and the electrode assembly and on an outer side with respect to the first left-side piece portion and the second left piece portion overlapping with each other. The first left-side connection portion is provided continuous to each of the first left-side piece portion and the left-side bottom piece portion, and is folded at a boundary between the first left-side connection portion and each of the first left-side piece portion and the left-side bottom piece portion, and is interposed between the first left-side piece portion and the left-side bottom piece portion. The second left-side connection portion is provided continuous to each of the second left-side piece portion and the left-side bottom piece portion, and is folded at a boundary between the second left-side connection portion and each of the second left-side piece portion and the left-side bottom piece portion, and is interposed between the second left-side piece portion and the left-side bottom piece portion. In the insulating sheet, the first left-side piece portion, the second left-side piece portion, the left-side bottom piece portion, the first left-side connection portion, and the second left-side connection portion form a first communication path for communicating inside and outside of the insulating sheet, the first communication path having a first open end at a position of an end of each of the first left-side connection portion and the second left-side connection portion on the opening side of the exterior package. The first communication path is located on a shortest reach path for the electrolyte solution reaching, from the outside of the insulating sheet, an end portion of the electrode assembly closest to a ridgeline portion of the exterior package on the bottom portion side and on the side of the one of the pair of second side walls.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
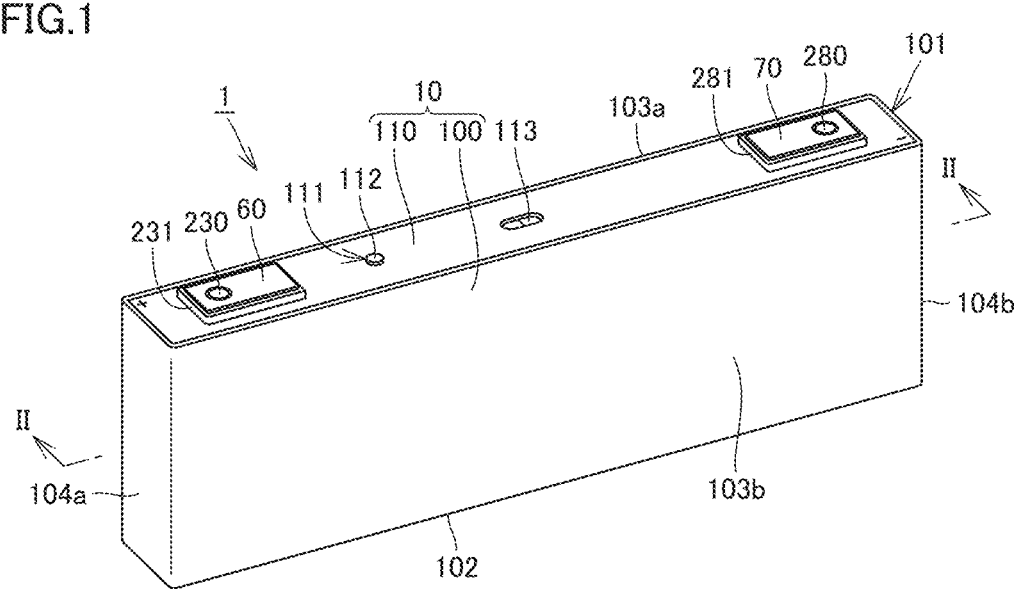
FIG. 1 is a perspective view showing a configuration of a battery according to a first embodiment of the present technology.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly.

It should be noted that in the present specification, the terms "comprise", "include", and "have" are open-end terms. That is, when a certain configuration is included, a configuration other than the foregoing configuration may or may not be included. Further, the present technology is not limited to one that necessarily exhibits all the functions and effects stated in the present embodiment.

In the present specification, the term "battery" is not limited to a lithium ion battery, and may include another battery such as a nickel-metal hydride battery. In the present specification, the term "electrode" may collectively represent a positive electrode and a negative electrode. Further, the term "electrode plate" may collectively represent a positive electrode plate and a negative electrode plate.

In the present specification, the "power storage cell" or the "power storage module" is not limited to a battery cell or a battery module, and may include a capacitor cell or a capacitor module.

First Embodiment

Figure 2:
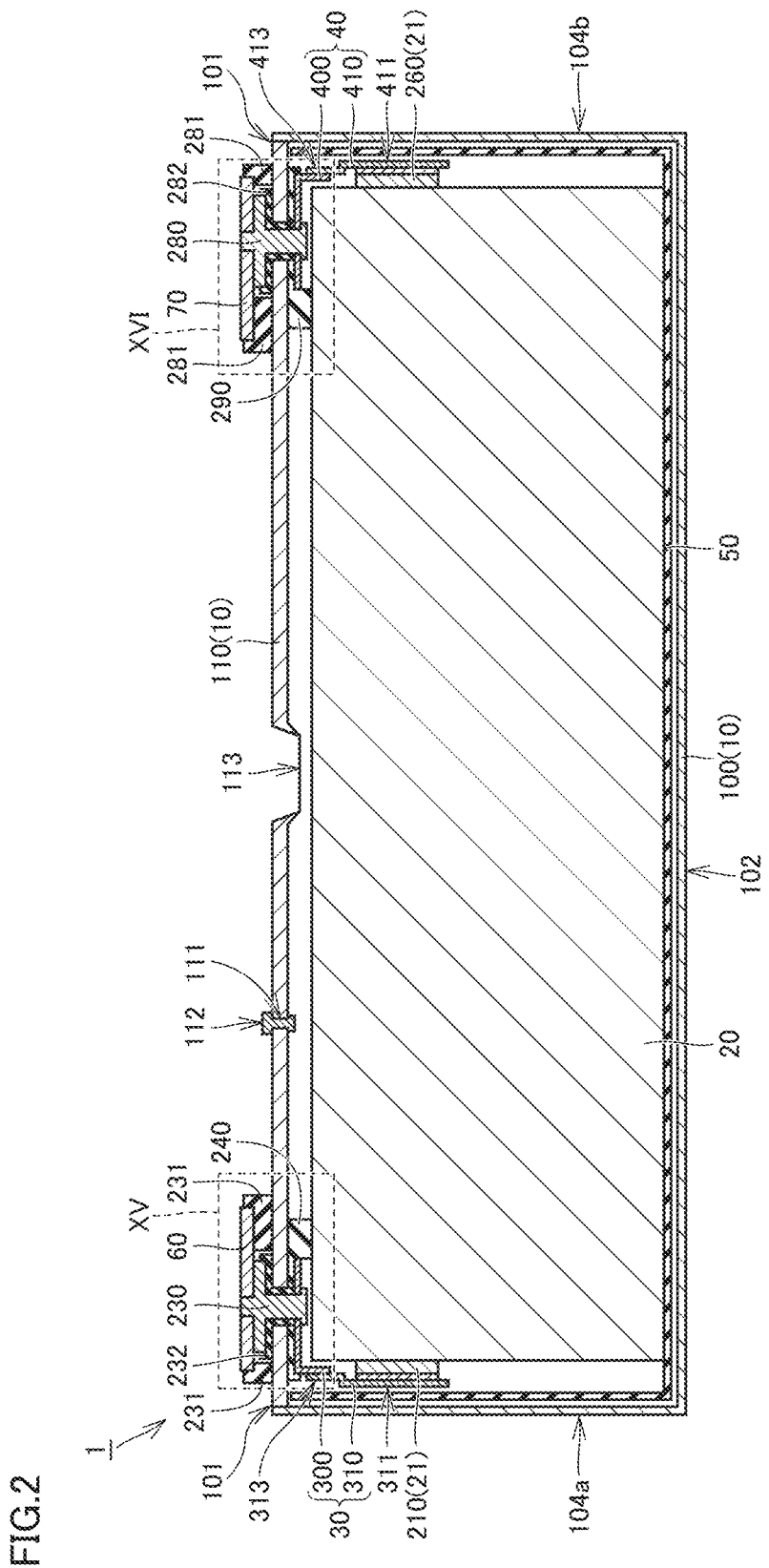
FIG. 2 is a cross sectional view of the battery of FIG. 1 when viewed in a direction of arrowed line II-II.
Figure 3:
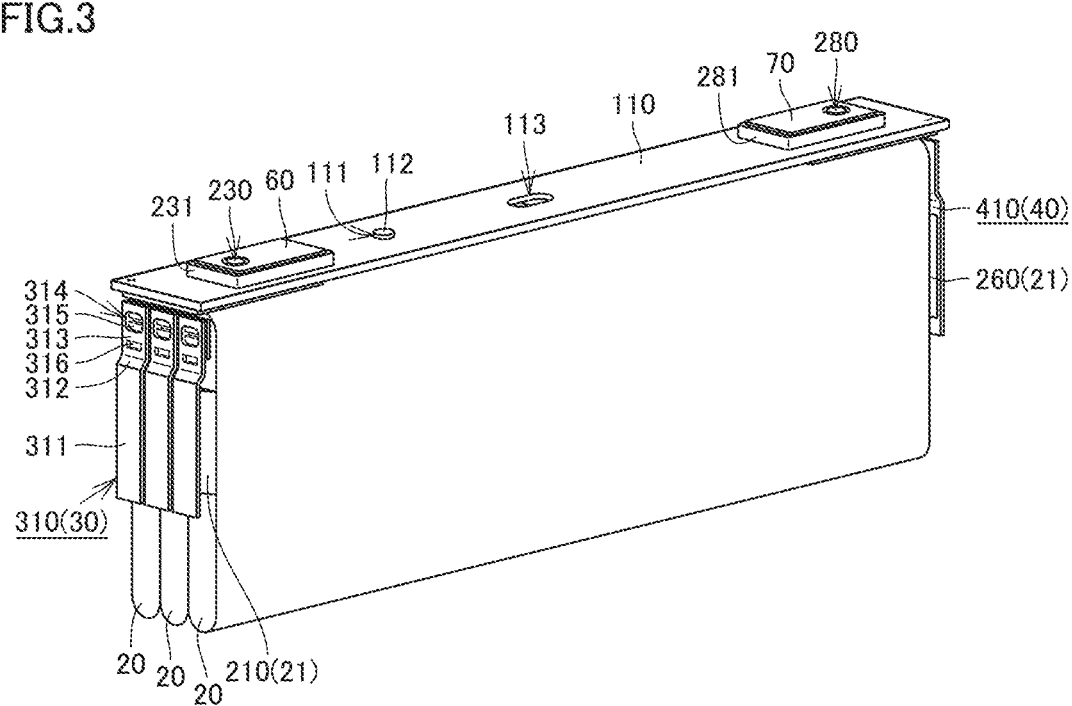
FIG. 3 is a perspective view showing an inner configuration of the battery according to the first embodiment of the present technology except for an exterior package and an insulating sheet included in the battery.

FIG. 1 is a perspective view showing a configuration of a battery according to a first embodiment of the present technology. FIG. 2 is a cross sectional view of the battery of FIG. 1 when viewed in a direction of arrowed line II-II. FIG. 3 is a perspective view showing an inner configuration of the battery according to the first embodiment of the present technology except for an exterior package and an insulating sheet included in the battery.

As shown in FIGS. 1 to 3, battery 1 includes a battery case 10, electrode assemblies 20, a positive electrode current collector 30, a negative electrode current collector 40, an insulating sheet 50, a positive electrode external conductive member 60, and a negative electrode external conductive member 70. Battery case 10 includes an exterior package 100 and a sealing plate 110.

Exterior package 100 has a prismatic shape having a bottom and is provided with an opening 101 through which electrode assemblies 20 are insertable. Exterior package 100 accommodates electrode assemblies 20 and an electrolyte solution. Exterior package 100 is composed of a metal. Specifically, exterior package 100 is composed of aluminum, an aluminum alloy, iron, an iron alloy, or the like.

Exterior package 100 has a bottom portion 102, a pair of first side walls 103a, 103b, and a pair of second side walls 104a, 104b.

Bottom portion 102 faces opening 101. The pair of first side walls 103a, 103b are provided to extend from edges of bottom portion 102 and face each other in parallel. The pair of second side walls 104a, 104b are provided to extend from edges of bottom portion 102 and face each other in parallel. Each of the pair of second side walls 104a, 104b connects between first side walls 103a, 103b. The area of each of the pair of first side walls 103a, 103b is larger than the area of each of the pair of second side walls 104a, 104b.

Sealing plate 110 seals opening 101 of exterior package 100. Sealing plate 110 is composed of, for example, aluminum, an aluminum alloy, iron, an iron alloy, or the like.

Sealing plate 110 is provided with an electrolyte solution injection hole 111. Electrolyte solution injection hole 111 is sealed by a sealing member 112. Sealing plate 110 is provided with a gas discharge valve 113 that is fractured to discharge gas inside battery case 10 to the outside, when pressure inside battery case 10 becomes more than or equal to a predetermined value.

Each of electrode assemblies 20 in the present embodiment is an electrode assembly having a flat shape and has a positive electrode plate and a negative electrode plate, which will be described later. Specifically, electrode assembly 20 is a wound type electrode assembly in which a strip-shaped positive electrode plate and a strip-shaped negative electrode plate are wound with a strip-shaped separator (not shown) being interposed therebetween.

As shown in FIGS. 2 and 3, battery case 10 stores electrode assemblies 20. Specifically, the plurality of wound type electrode assemblies are accommodated together with an electrolyte solution (not shown) inside insulating sheet 50 disposed in exterior package 100 of battery case 10. Battery case 10 according to the present embodiment accommodates three wound type electrode assemblies. Each of electrode assemblies 20 is accommodated in exterior package 100 with electrode assembly 20 being oriented in a direction in which the winding axis of electrode assembly 20 is parallel to bottom portion 102. It should be noted that the number of electrode assemblies 20 disposed in exterior package 100 is not limited to three. Further, electrode assembly 20 is not limited to the wound type electrode assembly, and may be a stacked type electrode assembly in which a plurality of positive electrode plates and a plurality of negative electrode plates are alternately stacked.

In electrode assembly 20, a tab portion 21 is provided on at least one of the positive electrode plate and the negative electrode plate, and extends on a side of electrode assembly 20. In electrode assembly 20 in the present embodiment, a positive electrode tab group 210 including a plurality of positive electrode tab portions is provided as one tab portion 21 at one end portion of electrode assembly 20 in the direction in which the winding axis of electrode assembly 20 extends. At the other end portion of electrode assembly 20 in the direction in which the winding axis of electrode assembly 20 extends, a negative electrode tab group 260 including a plurality of negative electrode tabs is provided as other tab portion 21.

Preferably, electrode assembly 20 is disposed in exterior package 100 with insulating sheet 50 interposed therebetween and is oriented such that one second side wall 104a faces positive electrode tab group 210 and other second side wall 104b faces negative electrode tab group 260.

As shown in FIGS. 1 to 3, a positive electrode terminal 230 and a negative electrode terminal 280 are attached to sealing plate 110. Specifically, as shown in FIGS. 2 and 3, positive electrode terminal 230 is electrically connected to positive electrode tab group 210 in each of the plurality of electrode assemblies 20 via positive electrode current collector 30. Positive electrode external conductive member 60 is connected to positive electrode terminal 230. It should be noted that battery 1 does not need to necessarily include positive electrode external conductive member 60.

Each of positive electrode terminal 230 and positive electrode external conductive member 60 is preferably composed of a metal, and is more preferably composed of aluminum or an aluminum alloy.

Negative electrode terminal 280 is electrically connected to negative electrode tab group 260 in each of the plurality of electrode assemblies 20 via negative electrode current collector 40. Negative electrode external conductive member 70 is connected to negative electrode terminal 280. It should be noted that battery 1 does not need to necessarily include negative electrode external conductive member 70.

Negative electrode terminal 280 is preferably composed of a metal, and is more preferably composed of copper or a copper alloy. Negative electrode external conductive member 70 is preferably composed of a metal, and is more preferably composed of aluminum or an aluminum alloy. It should be noted that negative electrode terminal 280 may have a region that is connected to negative electrode current collector 40 and that is composed of copper or a copper alloy, and a region that protrudes outward from sealing plate 110 and that is composed of aluminum or an aluminum alloy.

Positive electrode current collector 30 has a plate-like shape. Positive electrode current collector 30 is connected to one tab portion 21. Positive electrode current collector 30 in the present embodiment is connected to positive electrode tab group 210. Positive electrode current collector 30 is preferably composed of a metal, and is more preferably composed of aluminum or an aluminum alloy.

Positive electrode current collector 30 in the present embodiment includes: a first positive electrode current collector 300 serving as an extension current collector; and a second positive electrode current collector 310 serving as a current collector.

First positive electrode current collector 300 is connected to positive electrode terminal 230 between electrode assembly 20 and sealing plate 110. First positive electrode current collector 300 is connected to second positive electrode current collector 310 at its end portion on the side opposite to the side on which positive electrode terminal 230 is connected. Second positive electrode current collector 310 is connected to positive electrode tab group 210 on the side opposite to the side on which first positive electrode current collector 300 is connected. It should be noted that positive electrode current collector 30 may be constituted of one component.

Negative electrode current collector 40 has a plate-like shape. Negative electrode current collector 40 is connected to other tab portion 21. Negative electrode current collector 40 in the present embodiment is connected to negative electrode tab group 260. Negative electrode current collector 40 is preferably composed of a metal, and is more preferably composed of copper or a copper alloy.

Negative electrode current collector 40 in the present embodiment includes: a first negative electrode current collector 400 serving as an extension current collector; and a second negative electrode current collector 410 serving as a current collector. First negative electrode current collector 400 is connected to negative electrode terminal 280 between electrode assembly 20 and sealing plate 110. First negative electrode current collector 400 is connected to second negative electrode current collector 410 at its end portion on the side opposite to the side on which negative electrode terminal 280 is connected. Second negative electrode current collector 410 is connected to negative electrode tab group 260 on the side opposite to the side on which first negative electrode current collector 400 is connected. It should be noted that negative electrode current collector 40 may be constituted of one component.

As shown in FIG. 2, one insulating sheet 50 is disposed between electrode assembly 20 and exterior package 100. Insulating sheet 50 is preferably a sheet composed of a resin. The material of insulating sheet 50 is preferably polypropylene (PP), polyethylene terephthalate (PET), polyphenylene sulfide (PPS), polyimide (PI), or polyolefin (PO), for example. In particular, PP is preferable as the material of insulating sheet 50.

The melting point of insulating sheet 50 is preferably more than or equal to 100° C. and less than or equal to 400° C., is more preferably more than or equal to 120° C. and less than or equal to 300° C., and is particularly preferably more than or equal to 150° C. and less than or equal to 170° C.

The thickness of insulating sheet 50 is preferably more than or equal to 0.05 mm and less than or equal to 1 mm, is more preferably more than or equal to 0.08 mm and less than or equal to 0.5 mm, and is particularly preferably more than or equal to 0.1 mm and less than or equal to 0.2 mm.

Hereinafter, details of each component of battery 1 and a method of manufacturing battery 1 will be described. First, the positive electrode plate will be described.

Figure 4:
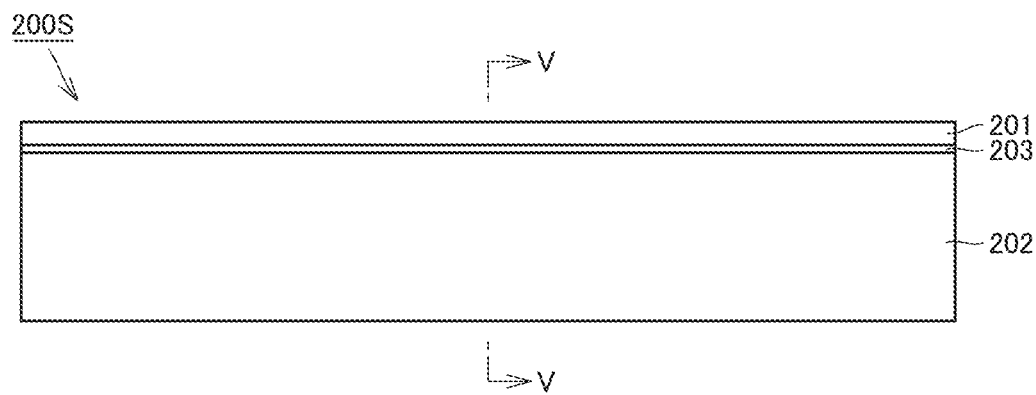
FIG. 4 is a front view showing a positive electrode raw sheet before forming a positive electrode plate included in the battery according to the first embodiment of the present technology.
Figure 5:
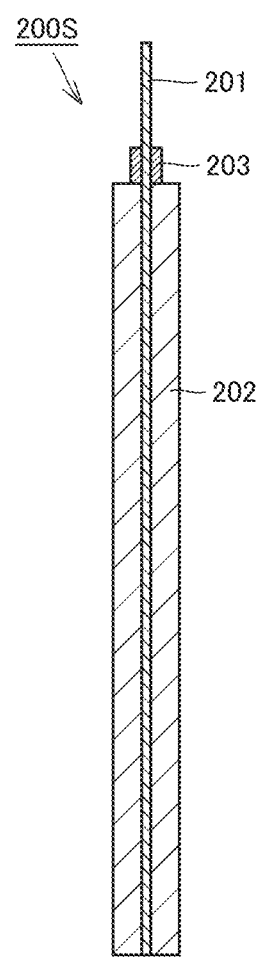
FIG. 5 is a cross sectional view of the positive electrode raw sheet of FIG. 4 when viewed in a direction of arrowed line V-V.
Figure 6:
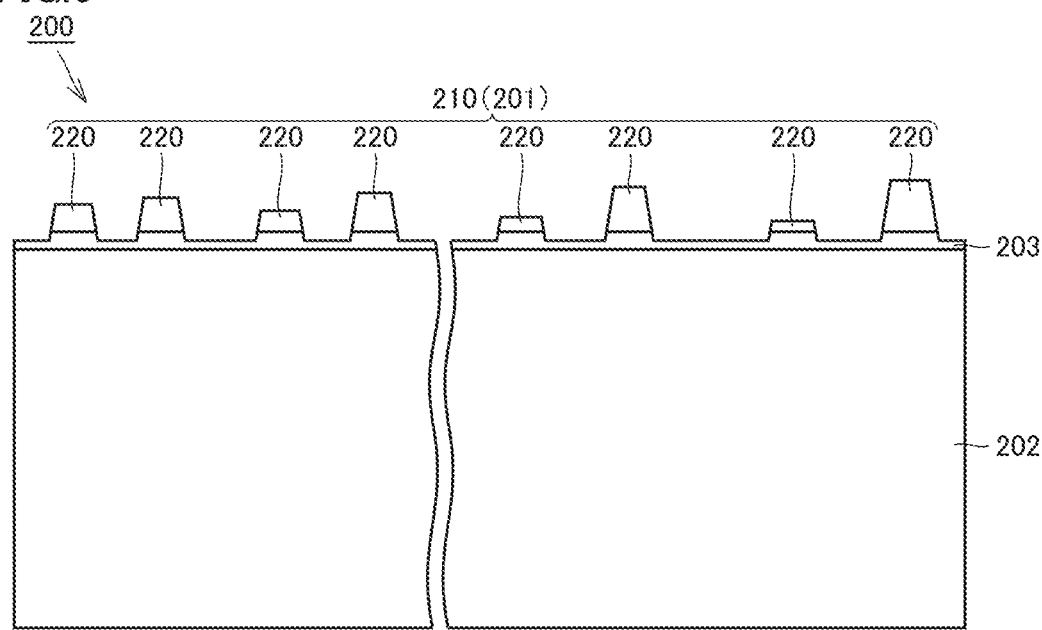
FIG. 6 is a front view showing a state after forming the positive electrode plate included in the battery according to the first embodiment of the present technology.

FIG. 4 is a front view showing a positive electrode raw sheet before forming the positive electrode plate included in the battery according to the first embodiment of the present technology. FIG. 5 is a cross sectional view of the positive electrode raw sheet of FIG. 4 when viewed in a direction of arrowed line V-V. FIG. 6 is a front view showing a state after forming the positive electrode plate included in the battery according to the first embodiment of the present technology.

The positive electrode plate is manufactured by processing a positive electrode raw sheet 200S. As shown in FIGS. 4 and 5, positive electrode raw sheet 200S includes a positive electrode core body 201, a positive electrode active material layer 202, and a positive electrode protection layer 203. Positive electrode core body 201 is an aluminum foil or an aluminum alloy foil.

Positive electrode active material layer 202 is formed on positive electrode core body 201 except for end portions of both surfaces of positive electrode core body 201 on one side. Positive electrode active material layer 202 is formed on positive electrode core body 201 by applying a positive electrode active material layer slurry using a die coater.

The positive electrode active material layer slurry is produced by kneading lithium nickel cobalt manganese composite oxide, polyvinylidene difluoride (PVdF), a carbon material, and N-methyl-2-pyrrolidone (NMP) to attain the following mass ratio: the lithium nickel cobalt manganese composite oxide:the PVdF:the carbon material=97.5:1:1.5. The lithium nickel cobalt manganese composite oxide serves as a positive electrode active material, the polyvinylidene difluoride (PVdF) serves as a binder, the carbon material serves as a conductive material, and the N-methyl-2-pyrrolidone (NMP) serves as a dispersion medium.

Positive electrode protection layer 203 is formed at one end portion of positive electrode active material layer 202 in the width direction and is in contact with positive electrode core body 201. Positive electrode protection layer 203 is formed on positive electrode core body 201 by applying a positive electrode protection layer slurry using a die coater.

The positive electrode protection layer slurry is produced by kneading alumina powder, a carbon material, PVdF, and NMP to attain the following mass ratio: the alumina powder:the carbon material:the PVdF=83:3:14. The carbon material serves as a conductive material, the PVdF serves as a binder, and the NMP serves as a dispersion medium.

Positive electrode core body 201 having the positive electrode active material layer slurry and the positive electrode protection layer slurry applied thereon is dried to remove the NMP included in each of the positive electrode active material layer slurry and the positive electrode protection layer slurry. Thus, positive electrode active material layer 202 and positive electrode protection layer 203 are formed. Further, positive electrode active material layer 202 is compressed, thereby forming positive electrode raw sheet 200S including positive electrode core body 201, positive electrode active material layer 202, and positive electrode protection layer 203. Positive electrode raw sheet 200S is cut into a predetermined shape to form the positive electrode plate. It should be noted that positive electrode raw sheet 200S can be cut by laser processing involving irradiation of energy rays, die machining, cutter machining, or the like.

As shown in FIG. 6, a plurality of positive electrode tabs 220 each constituted of positive electrode core body 201 are provided at one end portion of positive electrode plate 200, which is formed from positive electrode raw sheet 200S, in the width direction. In consideration of a state in which the plurality of positive electrode tabs 220 are stacked and connected to positive electrode current collector 30 as positive electrode tab group 210, the lengths or widths of the plurality of positive electrode tabs 220 in the protruding direction are appropriately adjusted in accordance with respective positions at which the plurality of positive electrode tabs 220 are formed.

Positive electrode protection layer 203 is provided at the root of each of the plurality of positive electrode tabs 220. It should be noted that positive electrode tab group 210 may not be provided with positive electrode protection layer 203.

Figure 7:
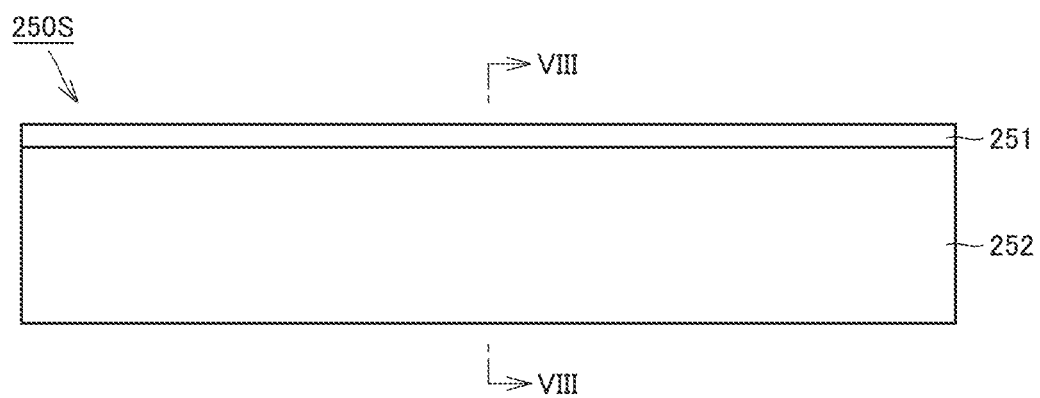
FIG. 7 is a front view showing a negative electrode raw sheet before forming a negative electrode plate included in the battery according to the first embodiment of the present technology.
Figure 8:
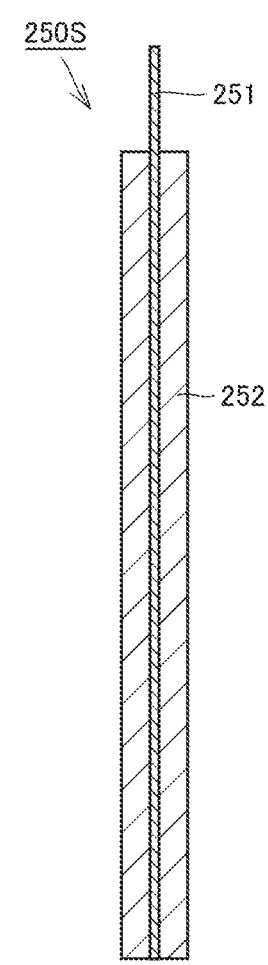
FIG. 8 is a cross sectional view of the negative electrode raw sheet of FIG. 7 when viewed in a direction of arrowed line VIII-VIII.
Figure 9:
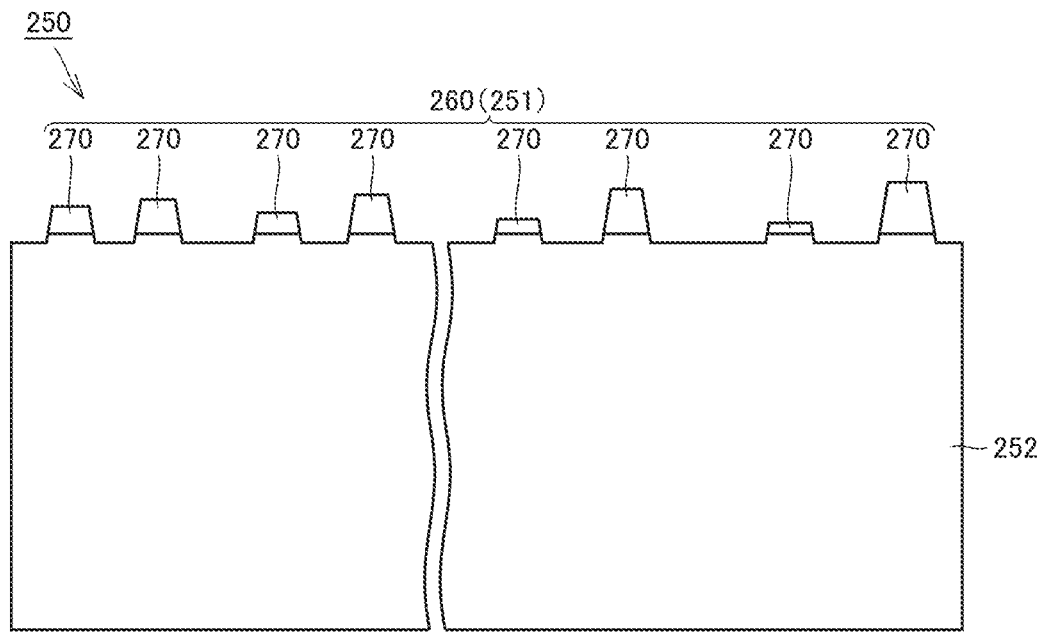
FIG. 9 is a front view showing a state after forming the negative electrode plate included in the battery according to the first embodiment of the present technology.

Next, the negative electrode plate will be described. FIG. 7 is a front view showing a negative electrode raw sheet before forming the negative electrode plate included in the battery according to the first embodiment of the present technology. FIG. 8 is a cross sectional view of the negative electrode raw sheet of FIG. 7 when viewed in a direction of arrowed FIG. 9 is a front view showing a state after forming the negative electrode plate included in the battery according to the first embodiment of the present technology.

The negative electrode plate is manufactured by processing a negative electrode raw sheet 250S. As shown in FIGS. 7 and 8, negative electrode raw sheet 250S includes a negative electrode core body 251 and a negative electrode active material layer 252. Negative electrode core body 251 is a copper foil or a copper alloy foil.

Negative electrode active material layer 252 is formed on negative electrode core body 251 except for end portions of both surfaces of negative electrode core body 251 on one side. Negative electrode active material layer 252 is formed by applying a negative electrode active material layer slurry using a die coater.

The negative electrode active material layer slurry is produced by kneading graphite, styrene-butadiene rubber (SBR), carboxymethyl cellulose (CMC), and water to attain the following mass ratio: the graphite:the SBR:the CMC=98:1:1. The graphite serves as a negative electrode active material, the styrene-butadiene rubber (SBR) and the carboxymethyl cellulose (CMC) serve as a binder, and the water serves as a dispersion medium.

Negative electrode core body 251 having the negative electrode active material layer slurry applied thereon is dried to remove the water included in the negative electrode active material layer slurry. Thus, negative electrode active material layer 252 is formed. Further, negative electrode active material layer 252 is compressed, thereby forming negative electrode raw sheet 250S including negative electrode core body 251 and negative electrode active material layer 252.

Negative electrode raw sheet 250S is cut into a predetermined shape to form negative electrode plate 250. It should be noted that negative electrode raw sheet 250S can be cut by laser processing involving irradiation of energy rays, die machining, cutter machining, or the like.

As shown in FIG. 9, a plurality of negative electrode tabs 270 each constituted of negative electrode core body 251 are provided at one end portion of negative electrode plate 250, which is formed from negative electrode raw sheet 250S, in the width direction. In consideration of a state in which the plurality of negative electrode tabs 270 are stacked and connected to negative electrode current collector 40 as negative electrode tab group 260, the lengths or widths of the plurality of negative electrode tabs 270 in the protruding direction are appropriately adjusted in accordance with respective positions at which the plurality of negative electrode tabs 270 are formed.

Figure 10:
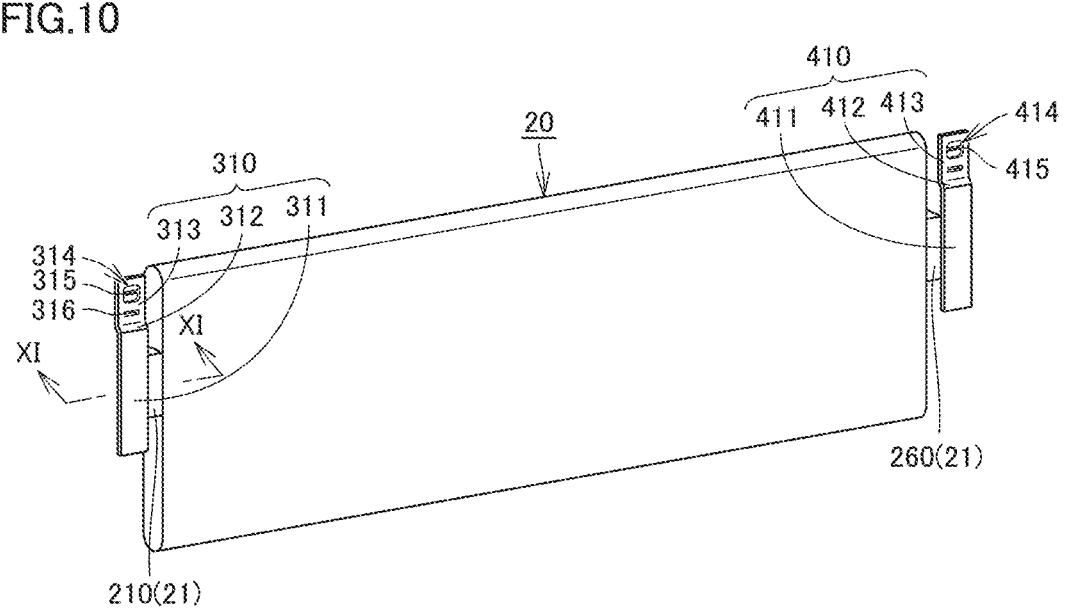
FIG. 10 is a perspective view showing configurations of an electrode assembly and a current collector included in the battery according to the first embodiment of the present technology.

Next, electrode assembly 20, positive electrode current collector 30, and negative electrode current collector 40 will be described. FIG. 10 is a perspective view showing configurations of the electrode assembly and the current collector included in the battery according to the first embodiment of the present technology. FIG. 10 shows a state before tab portion 21 is folded.

As shown in FIG. 10, strip-shaped positive electrode plate 200 and strip-shaped negative electrode plate 250 produced by the above-described method are wound with the strip-shaped separator (not shown) being interposed therebetween, thereby producing electrode assembly 20 having a flat shape. The separator is preferably a separator in which a heat-resistant layer is provided on a surface of a substrate composed of polyolefin. The heat-resistant layer includes ceramic particles and a binder. Examples of the ceramic particles usable herein include aluminum oxide, boehmite, aluminum hydroxide, titania, or the like.

Positive electrode tab group 210 including the plurality of positive electrode tabs 220 provided on positive electrode plate 200 is disposed at an end portion of one side of electrode assembly 20 in the direction in which the winding axis of electrode assembly 20 extends.

The thickness of each positive electrode tab 220 is preferably more than or equal to 5 μm and less than or equal to 30 μm, and is more preferably more than or equal to 8 μm and less than or equal to 20 μm. The number of stacked positive electrode tabs 220 in positive electrode tab group 210 is preferably more than or equal to 10, is more preferably more than or equal to 20, and is particularly preferably more than or equal to 30.

Negative electrode tab group 260 including the plurality of negative electrode tabs 270 provided on negative electrode plate 250 is disposed at an end portion of the other side of electrode assembly 20 in the direction in which the winding axis of electrode assembly 20 extends. Thus, tab portion 21 is constituted of at least one of positive electrode tab group 210 and negative electrode tab group 260. Tab portion 21 in the present embodiment is constituted of positive electrode tab group 210 and negative electrode tab group 260.

The thickness of negative electrode tab 270 is preferably more than or equal to 5 μm and less than or equal to 30 μm, and is more preferably more than or equal to 8 μm and less than or equal to 20 μm. The number of stacked negative electrode tabs 270 in negative electrode tab group 260 is preferably more than or equal to 10, is more preferably more than or equal to 20, and is particularly preferably more than or equal to 30.

Second positive electrode current collector 310 includes a first region 311, a second region 312, and a third region 313. As shown in FIG. 2, first region 311 faces one second side wall 104a. Tab portion 21 is connected to first region 311.

As shown in FIGS. 2 and 10, second region 312 is located on the sealing plate 110 side with respect to first region 311. Second region 312 is inclined with respect to both first region 311 and third region 313.

Third region 313 is located on the sealing plate 110 side with respect to second region 312 and faces one second side wall 104a. Third region 313 is connected to first positive electrode current collector 300.

As shown in FIG. 2, each of first region 311 and third region 313 is disposed such that a flat portion thereof is substantially perpendicular to the winding axis of electrode assembly 20. The shortest distance between first region 311 of second positive electrode current collector 310 and one second side wall 104a is shorter than the shortest distance between third region 313 of second positive electrode current collector 310 and one second side wall 104a in the direction orthogonal to one second side wall 104a, second positive electrode current collector 310 and one second side wall 104a facing each other.

As shown in FIG. 10, a recess 314 is provided in third region 313. The portion provided with recess 314 has a thickness thinner than those of the surroundings of the portion provided with recess 314. Recess 314 is provided with a through hole 315. In recess 314, third region 313 is joined to first positive electrode current collector 300. A fuse hole 316 can be provided in second positive electrode current collector 310.

As with second positive electrode current collector 310, second negative electrode current collector 410 includes a first region 411, a second region 412, and a third region 413. A recess 414 and a through hole 415 are provided in third region 413. In recess 414, third region 413 is joined to first negative electrode current collector 400.

Figure 11:
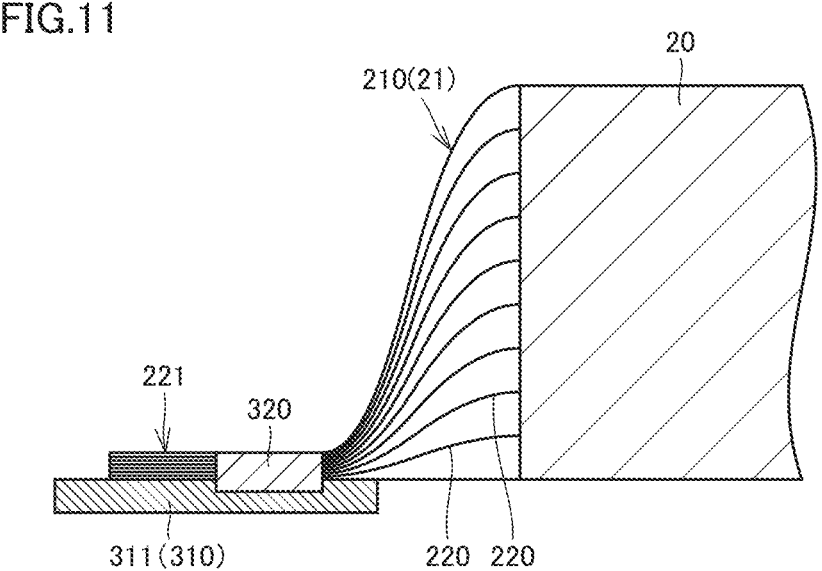
FIG. 11 is a cross sectional view of the electrode assembly and the current collector of FIG. 10 when viewed in a direction of arrowed line XI-XI.
Figure 12:
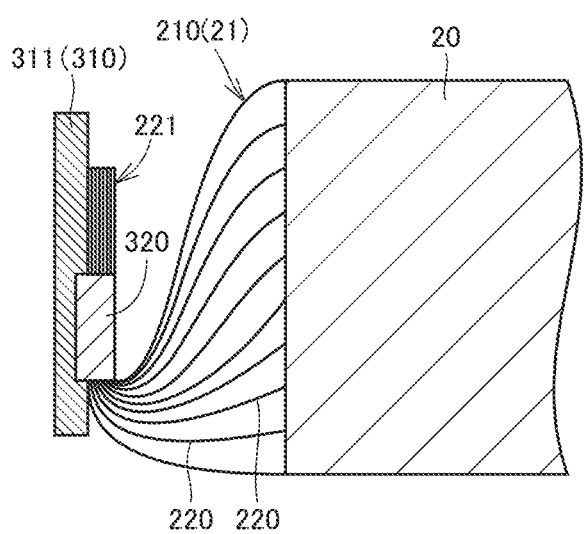
FIG. 12 is a cross sectional view showing a state in which a tab portion of the electrode assembly included in the battery according to the first embodiment of the present technology is folded.

Next, connection between the current collector and tab portion 21 will be described. FIG. 11 is a cross sectional view of the electrode assembly and the current collector of FIG. 10 when viewed in a direction of arrowed line XI-XI. FIG. 12 is a cross sectional view showing a state in which the tab portion of the electrode assembly included in the battery according to the first embodiment of the present technology is folded.

As shown in FIG. 11, first region 311 and positive electrode tab group 210 are joined to each other in a state in which tip portion 221 of positive electrode tab group 210 including the plurality of positive electrode tabs 220 is located adjacent to first region 311 of second positive electrode current collector 310. By this joining, a tab-joined portion 320 is formed. As a method of joining first region 311 and positive electrode tab group 210 to each other, ultrasonic welding, resistance welding, laser welding, or the like can be used.

As shown in FIG. 12, positive electrode tab group 210 having tab joined portion 320 formed therein is folded and is therefore bent. Tip portion 221 folded in tab portion 21 faces at least one of the pair of second side walls 104a, 104b. In the present embodiment, tip portion 221 faces one second side wall 104a. Thus, second positive electrode current collector 310 faces the side surface of battery case 10 with positive electrode tab group 210 being folded. It should be noted that tab-joined portion 320 may be joined to a surface of first region 311 opposite to the electrode assembly 20 side.

As with positive electrode tab group 210, first region 411 and negative electrode tab group 260 are joined to each other in a state in which negative electrode tab group 260 is located adjacent to first region 411 of second negative electrode current collector 410. By this joining, a tab joined portion is formed. Negative electrode tab group 260 having the tab joined portion formed therein is folded and is therefore bent. The tip portion folded in tab portion 21 faces at least one of the pair of second side walls 104a, 104b. In the present embodiment, the tip portion faces other second side wall 104b. Thus, second negative electrode current collector 410 faces other second side wall 104b with negative electrode tab group 260 being folded.

In first region 311 of second positive electrode current collector 310, tab joined portion 320 is preferably disposed close to the root side of positive electrode tab group 210. With this configuration, when positive electrode tab group 210 is folded, the bent shape can be stably formed in the vicinity of the root of positive electrode tab group 210. The same as in the case of second positive electrode current collector 310 applies to the position to which negative electrode tab group 260 is joined in first region 411 of second negative electrode current collector 410.

As shown in FIG. 2, the end portion of second positive electrode current collector 310 on the bottom portion 102 side of exterior package 100 is preferably located on the bottom portion 102 side with respect to the end portion of positive electrode tab group 210 on the bottom portion 102 side of exterior package 100. With this configuration, positive electrode tab group 210 can be stably folded in the step of folding positive electrode tab group 210. The same as in the case of second positive electrode current collector 310 applies to the lower end portion of second negative electrode current collector 410.

Figure 13:
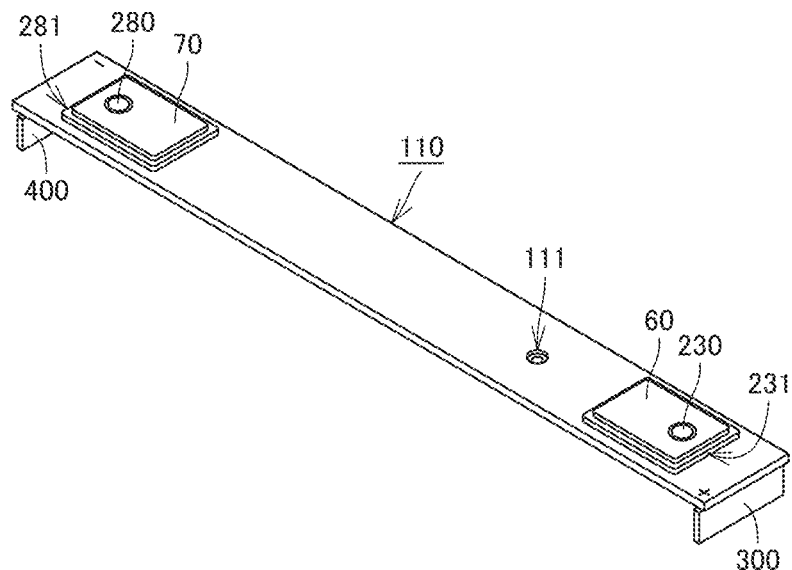
FIG. 13 is an upper perspective view showing configurations of a portion of the current collector and a sealing plate included in the battery according to the first embodiment of the present technology.
Figure 14:
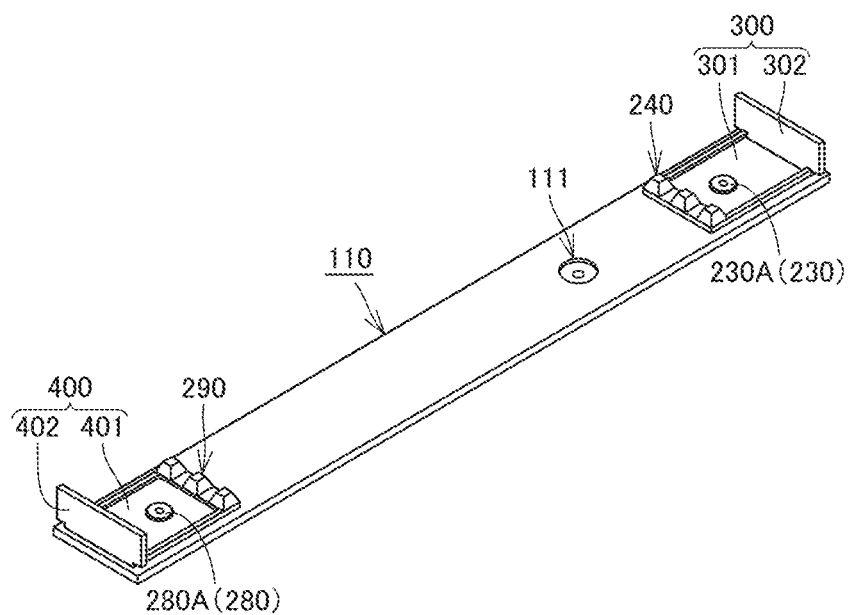
FIG. 14 is a lower perspective view showing the configurations of the portion of the current collector and the sealing plate included in the battery according to the first embodiment of the present technology.
Figure 15:
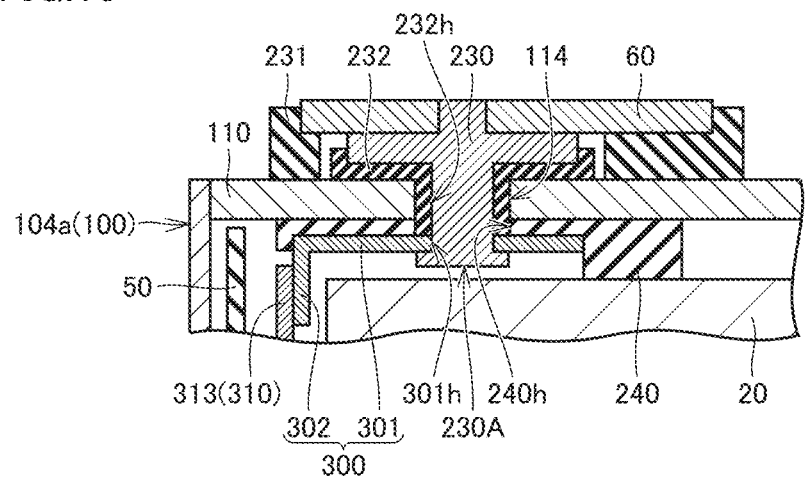
FIG. 15 is an enlarged cross sectional view showing an XV portion of the battery shown in FIG. 2.
Figure 16:
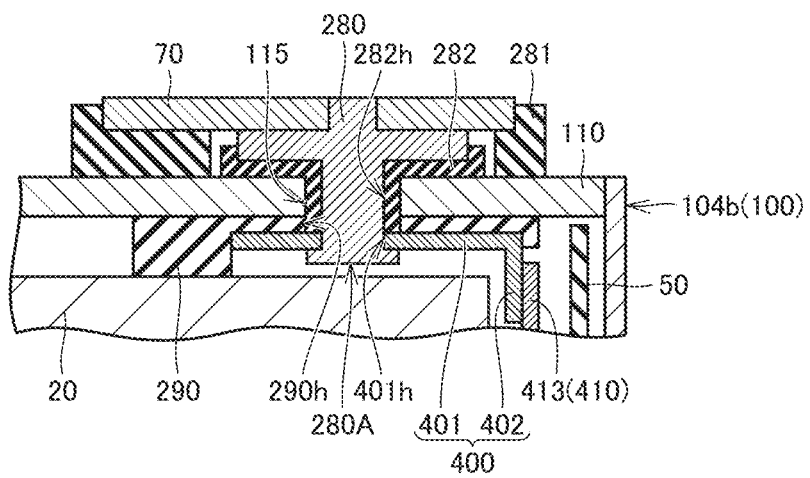
FIG. 16 is an enlarged cross sectional view showing an XVI portion of the battery shown in FIG. 2.

Next, sealing plate 110 will be described. FIG. 13 is an upper perspective view showing configurations of a portion of the current collector and the sealing plate included in the battery according to the first embodiment of the present technology. FIG. 14 is a lower perspective view showing the configurations of the portion of the current collector and the sealing plate included in the battery according to the first embodiment of the present technology. FIG. 15 is an enlarged cross sectional view of an XV portion of the battery shown in FIG. 2. FIG. 16 is an enlarged cross sectional view of an XVI portion of the battery shown in FIG. 2. FIG. 13 shows sealing plate 110 when viewed from the outside of battery 1, and FIG. 14 shows sealing plate 110 when viewed from the inside of battery 1.

As shown in FIGS. 13 and 15, sealing plate 110 is provided with a positive electrode terminal attachment hole 114 in the vicinity of one end portion thereof, and is provided with a negative electrode terminal attachment hole 115 in the vicinity of the other end portion thereof.

As shown in FIGS. 13 to 15, a first outer side insulating member 231 is disposed around positive electrode terminal attachment hole 114 on the surface of sealing plate 110 opposite to the electrode assembly 20 side, and an inner side insulating member 240 and first positive electrode current collector 300 are disposed around positive electrode terminal attachment hole 114 on the surface of sealing plate 110 on the electrode assembly 20 side.

Positive electrode terminal 230 is inserted from the outside of battery 1 into a through hole 232h of a second outer side insulating member 232, positive electrode terminal attachment hole 114 of sealing plate 110, a through hole 240h of inner side insulating member 240, and a through hole 301h of first positive electrode current collector 300.

Positive electrode terminal 230 is swaged onto first positive electrode current collector 300 to form a swaged portion 230A. It should be noted that swaged portion 230A of positive electrode terminal 230 may be welded to first positive electrode current collector 300 after the swaging.

As shown in FIGS. 13, 14 and 16, a first outer side insulating member 281 is disposed around negative electrode terminal attachment hole 115 on the surface of sealing plate 110 opposite to the electrode assembly 20 side, and an inner side insulating member 290 and first negative electrode current collector 400 are disposed around negative electrode terminal attachment hole 115 on the surface of sealing plate 110 on the electrode assembly 20 side.

Negative electrode terminal 280 is inserted from the outside of battery 1 into a through hole 282h of a second outer side insulating member 282, negative electrode terminal attachment hole 115 of sealing plate 110, a through hole 290h of inner side insulating member 290, and a through hole 401h of first negative electrode current collector 400. Negative electrode terminal 280 is swaged onto first negative electrode current collector 400 to form a swaged portion 280A. It should be noted that swaged portion 280A of negative electrode terminal 280 may be welded to first negative electrode current collector 400 after the swaging.

It should be noted that a timing at which positive electrode external conductive member 60 is connected to positive electrode terminal 230 or negative electrode external conductive member 70 is connected to negative electrode terminal 280 is not particularly limited. The timing of connecting may be after positive electrode terminal 230 and negative electrode terminal 280 are fixed to sealing plate 110 or may be after electrolyte solution injection hole 111 of sealing plate 110 connected to exterior package 100 is sealed.

As shown in FIGS. 13 to 15, first positive electrode current collector 300, which is an extension current collector, has an L-shape when viewed in cross section. First positive electrode current collector 300 includes a base portion 301 and a current collector connection portion 302. Base portion 301 is disposed between electrode assembly 20 and sealing plate 110 along sealing plate 110 with inner side insulating member 240 being interposed between base portion 301 and sealing plate 110.

Current collector connection portion 302 is folded from an end of base portion 301 and extends toward bottom portion 102. Current collector connection portion 302 is connected to third region 313 of second positive electrode current collector 310. Current collector connection portion 302 is disposed between one second side wall 104a of exterior package 100 and electrode assembly 20.

As shown in FIGS. 13, 14 and 16, first negative electrode current collector 400, which is an extension current collector, has an L-shape when viewed in cross section. First negative electrode current collector 400 includes a base portion 401 and a current collector connection portion 402. Base portion 401 is disposed between electrode assembly 20 and sealing plate 110 along sealing plate 110 with inner side insulating member 290 being interposed between base portion 401 and sealing plate 110.

Current collector connection portion 402 is folded from an end portion of base portion 401 and extends toward bottom portion 102. Current collector connection portion 402 is connected to third region 413 of second negative electrode current collector 410. Current collector connection portion 402 is disposed between other second side wall 104b of exterior package 100 and electrode assembly 20.

Next, connection between the first current collector and the second current collector will be described. As shown in FIG. 3, three electrode assemblies 20 each having second positive electrode current collector 310 and second negative electrode current collector 410 attached thereon are disposed side by side. On this occasion, in three electrode assemblies 20, positive electrode tab groups 210 are disposed on the same side, and negative electrode tab groups 260 are also disposed on the same side.

Each of second positive electrode current collectors 310 attached to three electrode assemblies 20 with each of positive electrode tab groups 210 of three electrode assemblies 20 being bent is joined to current collector connection portion 302 of first positive electrode current collector 300 fixed to sealing plate 110. Thus, a joined portion between current collector connection portion 302 and third region 313 is formed in recess 314.

Each of second negative electrode current collectors 410 attached to three electrode assemblies 20 with each of negative electrode tab groups 260 of three electrode assemblies 20 being bent is joined to current collector connection portion 402 of first negative electrode current collector 400 fixed to sealing plate 110. Thus, a joined portion between current collector connection portion 402 and third region 413 is formed in recess 414.

As a method of connecting first positive electrode current collector 300 and second positive electrode current collector 310 to each other or of connecting first negative electrode current collector 400 and second negative electrode current collector 410 to each other, ultrasonic welding, resistance welding, laser welding involving irradiation of high energy rays, or the like can be used. In particular, the laser welding is preferably used.

Next, insertion of electrode assemblies 20 into exterior package 100 will be described. As shown in FIG. 2, electrode assemblies 20 are disposed inside insulating sheet 50 that is in the form of a pouch or box. Electrode assemblies 20 covered with insulating sheet 50 are inserted into exterior package 100. Thus, the plurality of wound type electrode assemblies are accommodated in battery case 10. Next, sealing plate 110 is joined by laser welding or the like at opening 101 of exterior package 100.

Thereafter, a non-aqueous electrolyte solution is injected from electrolyte solution injection hole 111 provided in sealing plate 110, and electrolyte solution injection hole 111 is sealed by sealing member 112. Thus, battery 1 is completed. It should be noted that known materials can be used for the materials of positive electrode plate 200, negative electrode plate 250, the separator, the electrolyte solution, and the mechanical components used in battery 1 according to the present embodiment.

Hereinafter, a structure of insulating sheet 50 in the first embodiment of the present technology will be described in detail.

Figure 17:
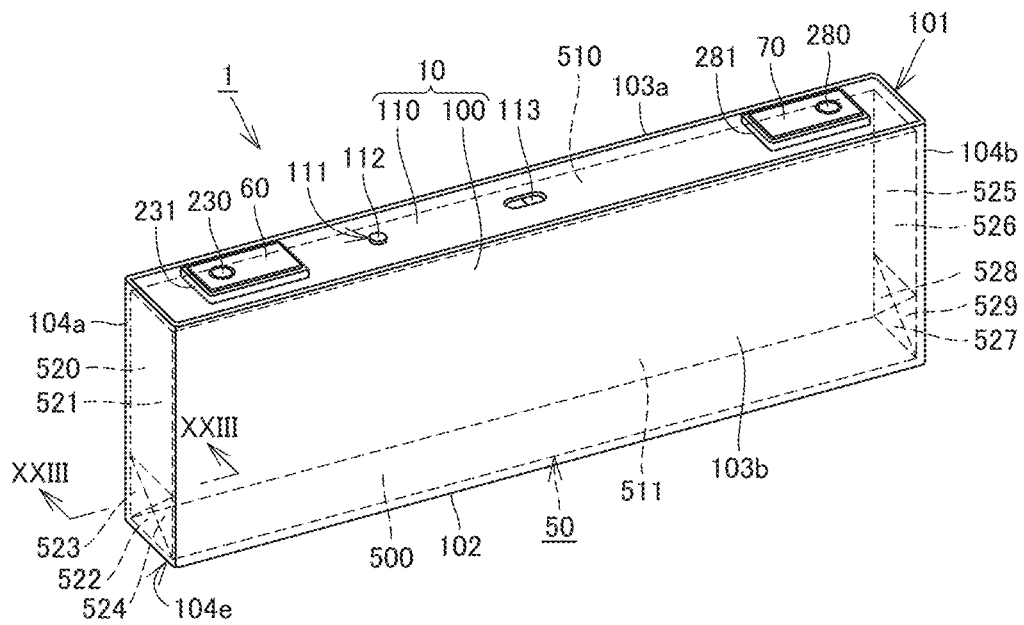
FIG. 17 is a perspective view showing a positional relation between a battery case and an insulating sheet included in the battery according to the first embodiment of the present technology.
Figure 18:
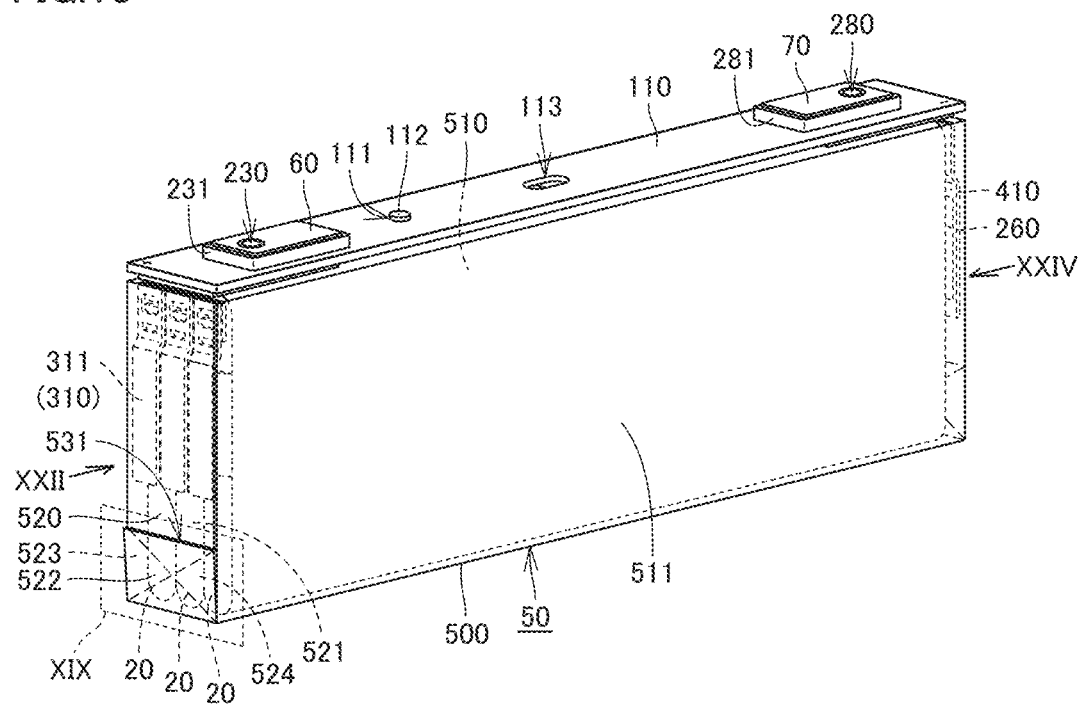
FIG. 18 is a perspective view showing the configuration of the battery except for the exterior package included in the battery according to the first embodiment of the present technology.

FIG. 17 is a perspective view showing a positional relation between the battery case and the insulating sheet included in the battery according to the first embodiment of the present technology. FIG. 18 is a perspective view showing the configuration of the battery except for the exterior package of the battery according to the first embodiment of the present technology.

As shown in FIGS. 17 and 18, insulating sheet 50 includes a bottom surface portion 500, a first side surface portion 510, a second side surface portion 511, a first left-side piece portion 520, a second left-side piece portion 521, a left-side bottom piece portion 522, a first left-side connection portion 523, and a second left-side connection portion 524.

Bottom surface portion 500 is disposed between electrode assembly 20 and bottom portion 102 of exterior package 100. Bottom surface portion 500 faces bottom portion 102.

First side surface portion 510 is disposed between one of the pair of first side walls 103a, 103b and electrode assembly 20. First side surface portion 510 in the present embodiment is disposed between one first side wall 103a and electrode assembly 20.

Second side surface portion 511 is disposed between the other of the pair of first side walls 103a, 103b and electrode assembly 20. Second side surface portion 511 in the present embodiment is disposed between other first side wall 103b and electrode assembly 20.

First left-side piece portion 520 is folded from an end portion of one side of first side surface portion 510. First left-side piece portion 520 in the present embodiment is folded from the end portion of the side of first side surface portion 510 on the positive electrode side of battery 1.

First left-side piece portion 520 is disposed between one of the pair of second side walls 104a, 104b and electrode assembly 20. First left-side piece portion 520 in the present embodiment is disposed between one second side wall 104a and electrode assembly 20.

Second left-side piece portion 521 is folded from an end portion of one side of second side surface portion 511. Second left-side piece portion 521 in the present embodiment is folded from the end portion of the side of second side surface portion 511 on the positive electrode side of battery 1.

Second left-side piece portion 521 is disposed between one of the pair of second side walls 104a, 104b and electrode assembly 20 to have at least a portion overlapping with first left-side piece portion 520. Second left-side piece portion 521 in the present embodiment is disposed between one second side wall 104a and electrode assembly 20.

Left-side bottom piece portion 522 extends from an end portion of one side of bottom surface portion 500. Left-side bottom piece portion 522 in the present embodiment extends from the end portion of the side of bottom surface portion 500 on the positive electrode side of battery 1.

Left-side bottom piece portion 522 is located between one of the pair of second side walls 104a, 104b and electrode assembly 20 and on an outer side with respect to first left-side piece portion 520 and second left-side piece portion 521 overlapping with each other. Left-side bottom piece portion 522 in the present embodiment is located between one second side wall 104a and electrode assembly 20 and on the one second side wall 104a side with respect to first left-side piece portion 520 and second left-side piece portion 521.

First left-side connection portion 523 is provided continuous to each of first left-side piece portion 520 and left-side bottom piece portion 522. First left-side connection portion 523 is folded at a boundary between first left-side connection portion 523 and each of first left-side piece portion 520 and left-side bottom piece portion 522, and is interposed between first left-side piece portion 520 and left-side bottom piece portion 522.

Second left-side connection portion 524 is provided continuous to each of second left-side piece portion 521 and left-side bottom piece portion 522. Second left-side connection portion 524 is folded at a boundary between second left-side connection portion 524 and each of second left-side piece portion 521 and left-side bottom piece portion 522, and is interposed between second left-side piece portion 521 and left-side bottom piece portion 522.

Figure 19:
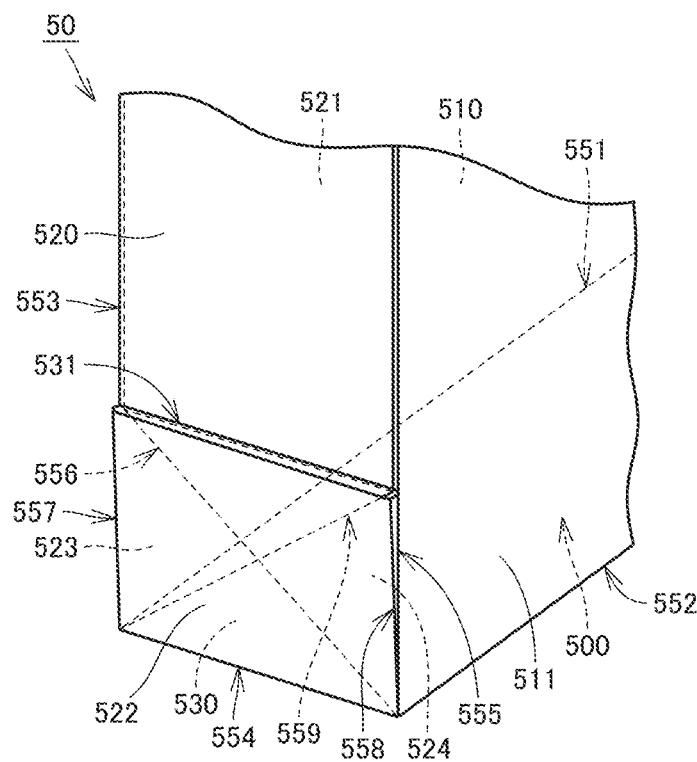
FIG. 19 is an enlarged perspective view showing an XIX portion of the battery shown in FIG. 18.

FIG. 19 is an enlarged perspective view showing an XIX portion of the battery shown in FIG. 18.

As shown in FIG. 19, a first communication path 530 is formed in insulating sheet 50 to communicate inside and outside of insulating sheet 50. First communication path 530 is constituted of first left-side piece portion 520, second left-side piece portion 521, left-side bottom piece portion 522, first left-side connection portion 523, and second left-side connection portion 524. First communication path 530 is a clearance formed by folding first left-side piece portion 520, second left-side piece portion 521, left-side bottom piece portion 522, first left-side connection portion 523, and second left-side connection portion 524 to position them adjacent to one another, and an electrolyte solution can flow through first communication path 530 between the inside and outside of insulating sheet 50.

First communication path 530 has a first open end 531. First open end 531 is located at a position of an end of each of first left-side connection portion 523 and second left-side connection portion 524 on the opening 101 side of exterior package 100. First open end 531 in the present embodiment is located at an end of each of left-side bottom piece portion 522, first left-side connection portion 523, and second left-side connection portion 524 on the opening 101 side of exterior package 100.

Figure 20:
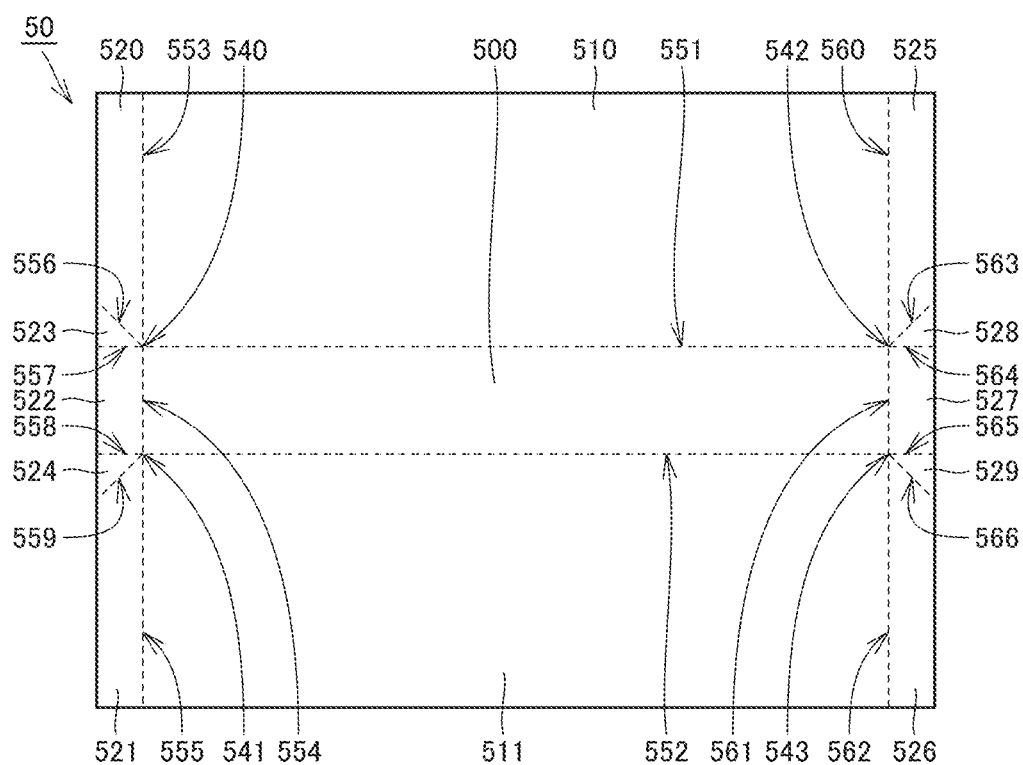
FIG. 20 is an expanded view showing the configuration of the insulating sheet included in the battery according to the first embodiment of the present technology.

FIG. 20 is an expanded view showing the configuration of the insulating sheet included in the battery according to the first embodiment of the present technology.

As shown in FIGS. 18 and 20, one insulating sheet 50 is folded into a tubular shape with a bottom. As shown in FIG. 20, bottom surface portion 500 has a quadrangular shape having a pair of long sides and a pair of short sides orthogonal to the pair of long sides.

First side surface portion 510 is connected to one of the pair of long sides of bottom surface portion 500. Specifically, first side surface portion 510 and bottom surface portion 500 are connected to each other continuously across the entire length of one of the pair of long sides of bottom surface portion 500.

Second side surface portion 511 is connected to the other of the pair of long sides of bottom surface portion 500. Specifically, second side surface portion 511 and bottom surface portion 500 are connected to each other continuously across the entire length of the other of the pair of long sides of bottom surface portion 500.

Bottom surface portion 500 and left-side bottom piece portion 522 are connected to each other continuously across the entire length of one of the pair of short sides of bottom surface portion 500.

First side surface portion 510 and first left-side piece portion 520 are connected to each other continuously across the entire length of a range, facing electrode assembly 20, of the boundary between first side surface portion 510 and first left-side piece portion 520. In the present embodiment, first side surface portion 510 and first left-side piece portion 520 are connected to each other continuously across the entire length of the boundary between first side surface portion 510 and first left-side piece portion 520. However, a discontinuous portion may be provided between first side surface portion 510 and first left-side piece portion 520 by forming a cut or through hole at an upper end portion of the boundary between first side surface portion 510 and first left-side piece portion 520 so as not to face electrode assembly 20.

Second side surface portion 511 and second left-side piece portion 521 are connected to each other continuously across the entire length of a range, facing electrode assembly 20, of the boundary between second side surface portion 511 and second left-side piece portion 521. In the present embodiment, second side surface portion 511 and second left-side piece portion 521 are connected to each other continuously across the entire length of the boundary between second side surface portion 511 and second left-side piece portion 521. However, a discontinuous portion may be provided between second side surface portion 511 and second left-side piece portion 521 by forming a cut or through hole at an upper end portion of the boundary between second side surface portion 511 and second left-side piece portion 521 so as not to face electrode assembly 20.

In insulating sheet 50, a first folding line 551, a second folding line 552, a third folding line 553, a fourth folding line 554, a fifth folding line 555, a sixth folding line 556, a seventh folding line 557, an eighth folding line 558, and a ninth folding line 559 are formed.

First folding line 551 is formed at a boundary between bottom surface portion 500 and first side surface portion 510. Second folding line 552 is formed at a boundary between bottom surface portion 500 and second side surface portion 511. Third folding line 553 is formed at a boundary between first side surface portion 510 and first left-side piece portion 520. Fourth folding line 554 is formed at a boundary between one of the pair of short sides of bottom surface portion 500 and left-side bottom piece portion 522. Fifth folding line 555 is formed at a boundary between second side surface portion 511 and second left-side piece portion 521. Sixth folding line 556 is formed at a boundary between first left-side piece portion 520 and first left-side connection portion 523. Seventh folding line 557 is formed at a boundary between left-side bottom piece portion 522 and first left-side connection portion 523. Eighth folding line 558 is formed at a boundary between left-side bottom piece portion 522 and second left-side connection portion 524. Ninth folding line 559 is formed at a boundary between second left-side piece portion 521 and second left-side connection portion 524.

Each of first folding line 551, second folding line 552, third folding line 553, fourth folding line 554, fifth folding line 555, seventh folding line 557, and eighth folding line 558 is formed by depressing insulating sheet 50 from one surface side of insulating sheet 50. Each of sixth folding line 556 and ninth folding line 559 is formed by depressing insulating sheet 50 from the other surface side of insulating sheet 50. Thus, left-side bottom piece portion 522 can be disposed on an outer side with respect to first left-side piece portion 520 and second left-side piece portion 521.

Insulating sheet 50 further includes a first intersection 540 and a second intersection 541. First intersection 540 is an intersection of first folding line 551, third folding line 553, fourth folding line 554, sixth folding line 556, and seventh folding line 557. Second intersection 541 is an intersection of second folding line 552, fourth folding line 554, fifth folding line 555, eighth folding line 558, and ninth folding line 559. First intersection 540 and second intersection 541 are located at corner portions on a side of one of the pair of short sides of bottom surface portion 500.

Figure 21:
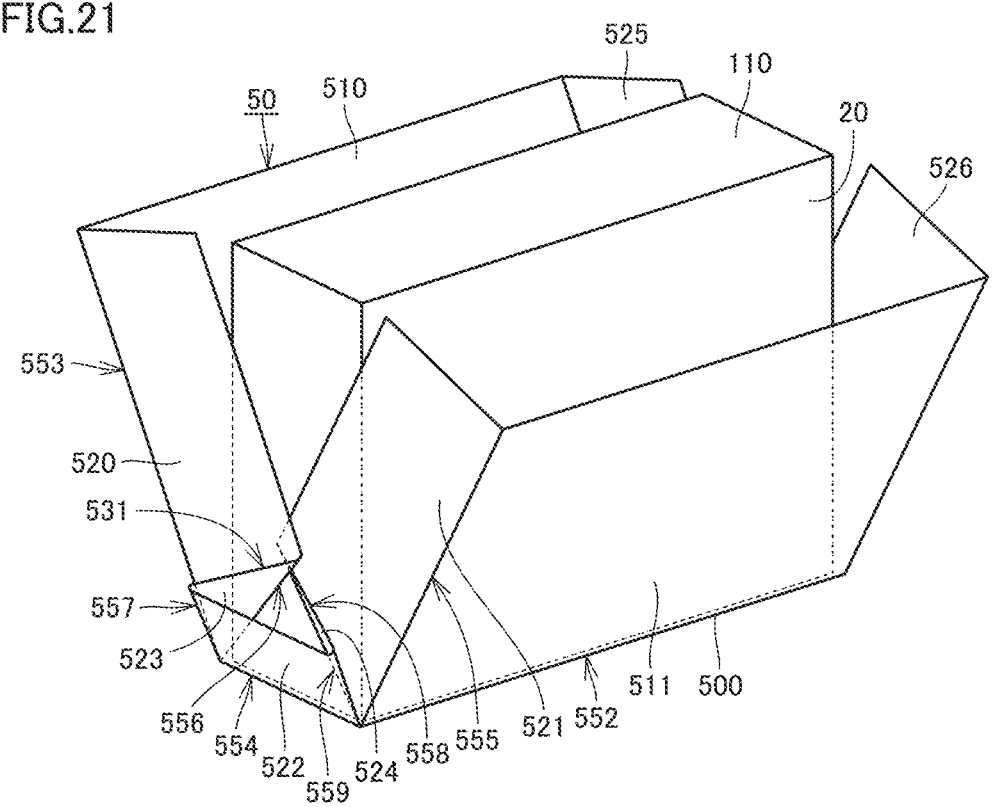
FIG. 21 is a perspective view showing a state in which the insulating sheet included in the battery according to the first embodiment of the present technology is folded.

FIG. 21 is a perspective view showing a state in which the insulating sheet included in the battery according to the first embodiment of the present technology is folded.

As shown in FIG. 21, insulating sheet 50 is formed into a tubular shape with a bottom by folding first side surface portion 510, second side surface portion 511, first left-side piece portion 520, second left-side piece portion 521, left-side bottom piece portion 522, first left-side connection portion 523, and second left-side connection portion 524 with respect to bottom surface portion 500 along first to ninth folding lines 551 to 559.

Specifically, first left-side piece portion 520 is folded to be located on an outer side with respect to second left-side piece portion 521. First left-side piece portion 520 and first left-side connection portion 523 are folded to be interposed between left-side bottom piece portion 522 and second left-side connection portion 524. Thus, as shown in FIG. 19, first left-side piece portion 520, second left-side piece portion 521, left-side bottom piece portion 522, first left-side connection portion 523, and second left-side connection portion 524, which are folded and overlap with one another, provide insulating sheet 50 with first communication path 530, which is a clearance for communicating the inside and outside of insulating sheet 50.

Figure 22:
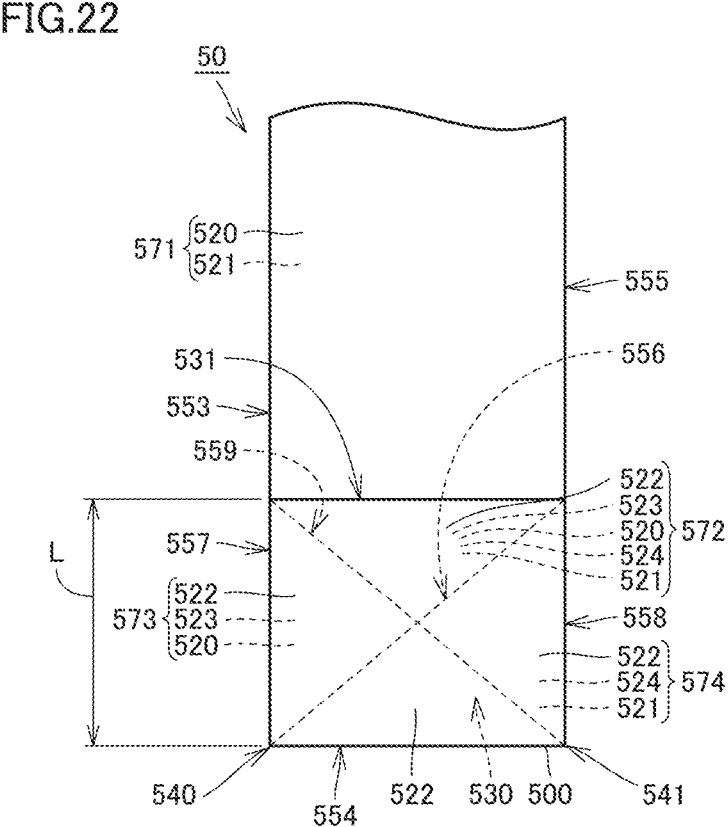
FIG. 22 is a side view of the battery of FIG. 18 when viewed in a direction of arrow XXII.

FIG. 22 is a side view of the battery of FIG. 18 when viewed in a direction of arrow XXII. As shown in FIG. 22, insulating sheet 50 further includes a first overlapping region 571, a second overlapping region 572, a third overlapping region 573, and a fourth overlapping region 574.

First overlapping region 571 is a region in which first left-side piece portion 520 and second left-side piece portion 521 overlap with each other between one of the pair of second side walls 104a, 104b and electrode assembly 20. First overlapping region 571 in the present embodiment is located between one second side wall 104a and electrode assembly 20.

Second overlapping region 572 is a region in which first left-side piece portion 520, second left-side piece portion 521, and left-side bottom piece portion 522 overlap with one another. In second overlapping region 572 in the present embodiment, first left-side piece portion 520, second left-side piece portion 521, left-side bottom piece portion 522, first left-side connection portion 523, and second left-side connection portion 524 overlap with one another.

Third overlapping region 573 is a region in which first left-side piece portion 520, left-side bottom piece portion 522, and first left-side connection portion 523 overlap with one another. Fourth overlapping region 574 is a region in which second left-side piece portion 521, left-side bottom piece portion 522, and second left-side connection portion 524 overlap with one another.

First open end 531 is located at a position of an end of each of third overlapping region 573 and fourth overlapping region 574 on the opening 101 side of exterior package 100. First open end 531 in the present embodiment is located at an end of each of second overlapping region 572, third overlapping region 573, and fourth overlapping region 574 on the opening 101 side.

A shortest distance L between bottom surface portion 500 and first open end 531 is more than or equal to 5 mm in the direction orthogonal to bottom surface portion 500. With this configuration, a creepage distance of more than or equal to 5 mm can be secured between exterior package 100 and an end portion (end portion 20e described later) of electrode assembly 20 on the short side of the bottom surface of electrode assembly 20. In insulating sheet 50 according to the present embodiment, no portion at which the inside and outside of insulating sheet 50 communicate with each other is present within a radius of 5 mm from each of first intersection 540 and second intersection 541, so that a creeping distance of more than or equal to 5 mm can be secured between exterior package 100 and the end portion (end portion 20e described later) of electrode assembly 20 on the short side of the bottom surface of electrode assembly 20.

Figure 23:
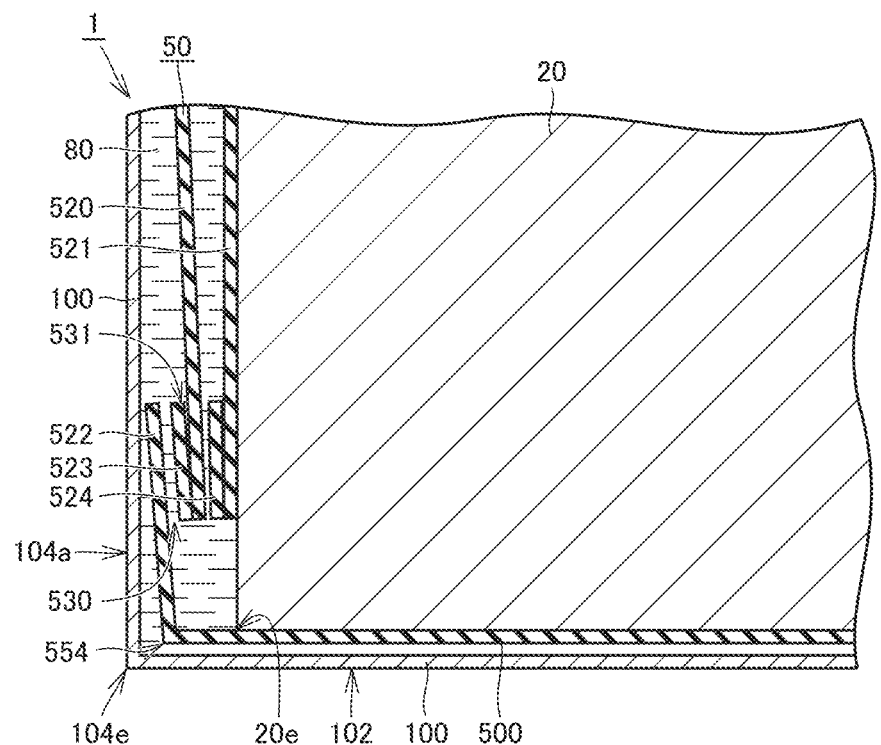
FIG. 23 is a cross sectional view of the battery of FIG. 17 when viewed in a direction of arrowed line XXIII-XXIII

FIG. 23 is a cross sectional view of the battery of FIG. 17 when viewed in a direction of arrowed line XXIII-XXIII FIG. 23 shows a cross section at a position at which sixth folding line 556 and ninth folding line 559 intersect, in a direction perpendicular to bottom surface portion 500.

As shown in FIG. 23, at the corner portion of insulating sheet 50 on the bottom portion 102 side, second left-side piece portion 521, second left-side connection portion 524, first left-side piece portion 520, first left-side connection portion 523, and left-side bottom piece portion 522 are disposed in this order from electrode assembly 20 toward exterior package 100.

First communication path 530 is located on a shortest reach path for the electrolyte solution reaching, from the outside of insulating sheet 50, an end portion of electrode assembly 20 closest to a ridgeline portion of exterior package 100 on the bottom portion 102 side and on the side of one of the pair of second side walls 104a, 104b. In the present embodiment, first communication path 530 is located on a shortest reach path for electrolyte solution 80 reaching, from the outside of insulating sheet 50, end portion 20e of electrode assembly 20 closest to ridgeline portion 104e of exterior package 100 on the bottom portion 102 side and on the one second side wall 104a side.

Entry of water or the like in the vicinity of a battery 1 may cause a short-circuit path, in which a high voltage is applied, to be formed between batteries 1 located at both ends of a series connection of a plurality of batteries 1. In this case, the highest voltage is applied between end portion 20e of electrode assembly 20 and ridgeline portion 104e of exterior package 100 inside battery 1 located on the short-circuit path. In battery 1 according to the present embodiment, since first communication path 530 is located on the shortest reach path for electrolyte solution 80 reaching, from the outside of insulating sheet 50, end portion 20e of electrode assembly 20, the creepage distance between end portion 20e of electrode assembly 20 and ridgeline portion 104e of exterior package 100 can be secured even when a high voltage is applied between end portion 20e of electrode assembly 20 and ridgeline portion 104e of exterior package 100, thereby suppressing occurrence of partial discharge between end portion 20e of electrode assembly 20 and ridgeline portion 104e of exterior package 100.

Figure 24:
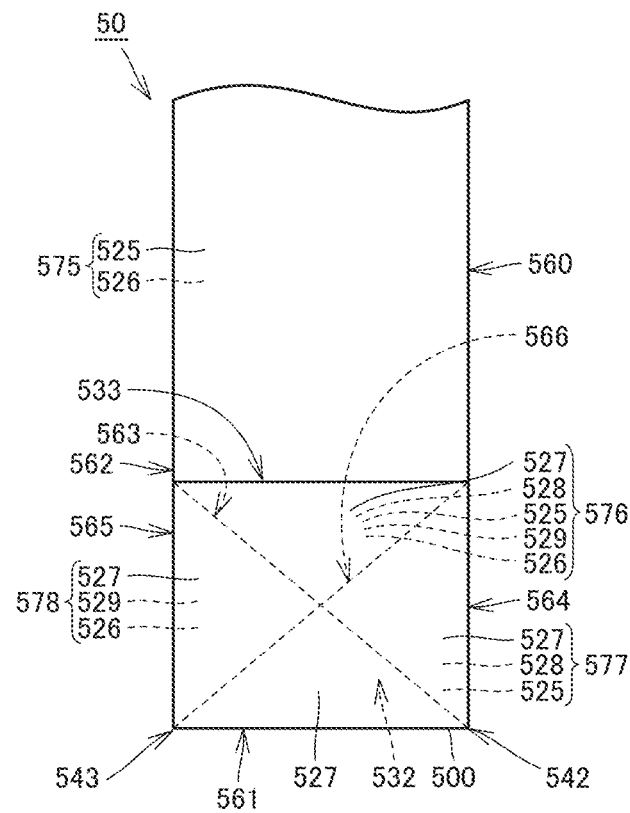
FIG. 24 is a side view of the battery of FIG. 18 when viewed in a direction of arrow XXIV.

FIG. 24 is a side view of the battery of FIG. 18 when viewed in a direction of arrow XXIV. As shown in FIGS. 17, 20 and 24, insulating sheet 50 includes a first right-side piece portion 525, a second right-side piece portion 526, a right-side bottom piece portion 527, a first right-side connection portion 528, and a second right-side connection portion 529.

First right-side piece portion 525 is folded from an end portion of the other side of first side surface portion 510. First right-side piece portion 525 in the present embodiment is folded from the end portion of the side of first side surface portion 510 on the negative electrode side of battery 1.

First right-side piece portion 525 is disposed between the other of the pair of second side walls 104a, 104b and electrode assembly 20. First right-side piece portion 525 in the present embodiment is disposed between other second side wall 104b and electrode assembly 20.

Second right-side piece portion 526 is folded from an end portion of the other side of second side surface portion 511. Second right-side piece portion 526 in the present embodiment is folded from the end portion of the side of second side surface portion 511 on the negative electrode side of battery 1.

Second right-side piece portion 526 is disposed between the other of the pair of second side walls 104a, 104b and electrode assembly 20 to have at least a portion overlapping with first right-side piece portion 525. Second right-side piece portion 526 in the present embodiment is disposed between other second side wall 104b and electrode assembly 20.

Right-side bottom piece portion 527 extends from an end portion of the other side of bottom surface portion 500. Right-side bottom piece portion 527 in the present embodiment extends from the end portion of the side of bottom surface portion 500 on the negative electrode side of battery 1.

Right-side bottom piece portion 527 is located between the other of the pair of second side walls 104a, 104b and electrode assembly 20 and on an outer side with respect to first right-side piece portion 525 and second right-side piece portion 526 overlapping with each other. Right-side bottom piece portion 527 in the present embodiment is located between other second side wall 104b and electrode assembly 20 and on the other second side wall 104b side with respect to first right-side piece portion 525 and second right-side piece portion 526.

First right-side connection portion 528 is provided continuous to each of first right-side piece portion 525 and right-side bottom piece portion 527. First right-side connection portion 528 is folded at a boundary between first right-side connection portion 528 and each of first right-side piece portion 525 and right-side bottom piece portion 527 and is interposed between first right-side piece portion 525 and right-side bottom piece portion 527.

Second right-side connection portion 529 is provided continuous to each of second right-side piece portion 526 and right-side bottom piece portion 527. Second right-side connection portion 529 is folded at a boundary between second right-side connection portion 529 and each of second right-side piece portion 526 and right-side bottom piece portion 527, and is interposed between second right-side piece portion 526 and right-side bottom piece portion 527.

In insulating sheet 50, a tenth folding line 560, an eleventh folding line 561, a twelfth folding line 562, a thirteenth folding line 563, a fourteenth folding line 564, a fifteenth folding line 565, and a sixteenth folding line 566 are formed.

Tenth folding line 560 is formed at a boundary between first side surface portion 510 and first right-side piece portion 525. Eleventh folding line 561 is formed at a boundary between the other of the pair of short sides of bottom surface portion 500 and right-side bottom piece portion 527. Twelfth folding line 562 is formed at a boundary between second side surface portion 511 and second right-side piece portion 526. Thirteenth folding line 563 is formed at a boundary between first right-side piece portion 525 and first right-side connection portion 528. Fourteenth folding line 564 is formed at a boundary between right-side bottom piece portion 527 and first right-side connection portion 528. The fifteenth folding line is formed at a boundary between right-side bottom piece portion 527 and second right-side connection portion 529. Sixteenth folding line 566 is formed at a boundary between second right-side piece portion 526 and second right-side connection portion 529.

A second communication path 532 is formed in insulating sheet 50 to communicate inside and outside of insulating sheet 50. Second communication path 532 is constituted of first right-side piece portion 525, second right-side piece portion 526, right-side bottom piece portion 527, first right-side connection portion 528, and second right-side connection portion 529. First communication path 530 is a clearance formed by folding first right-side piece portion 525, second right-side piece portion 526, right-side bottom piece portion 527, first right-side connection portion 528, and second right-side connection portion 529 to position them adjacent to one another, and an electrolyte solution can flow through second communication path 532 between the inside and outside of insulating sheet 50.

Second communication path 532 has a second open end 533. Second open end 533 is located at an end of each of first right-side connection portion 528 and second right-side connection portion 529 on the opening 101 side of exterior package 100. Second open end 533 in the present embodiment is located at an end of each of right-side bottom piece portion 527, first right-side connection portion 528, and second right-side connection portion 529 on the opening 101 side of exterior package 100.

Insulating sheet 50 further includes a fifth overlapping region 575, a sixth overlapping region 576, a seventh overlapping region 577, and an eighth overlapping region 578.

Fifth overlapping region 575 is a region in which first right-side piece portion 525 and second right-side piece portion 526 overlap with each other between the other of the pair of second side walls 104a, 104b and electrode assembly 20. Fifth overlapping region 575 in the present embodiment is located between other second side wall 104b and electrode assembly 20.

Sixth overlapping region 576 is a region in which first right-side piece portion 525, second right-side piece portion 526 and right-side bottom piece portion 527 overlap with one another. In sixth overlapping region 576 in the present embodiment, first right-side piece portion 525, second right-side piece portion 526, right-side bottom piece portion 527, first right-side connection portion 528, and second right-side connection portion 529 overlap with one another.

Seventh overlapping region 577 is a region in which first right-side piece portion 525, right-side bottom piece portion 527 and first right-side connection portion 528 overlap with one another. Eighth overlapping region 578 is a region in which second right-side piece portion 526, right-side bottom piece portion 527, and second right-side connection portion 529 overlap with one another.

Second open end 533 is located at a position of an end of each of seventh overlapping region 577 and eighth overlapping region 578 on the opening 101 side of exterior package 100. Second open end 533 in the present embodiment is located at an end of each of sixth overlapping region 576, seventh overlapping region 577, and eighth overlapping region 578 on the opening 101 side.

Insulating sheet 50 further includes a third intersection 542 and a fourth intersection 543. Third intersection 542 is an intersection of first folding line 551, tenth folding line 560, eleventh folding line 561, thirteenth folding line 563, and fourteenth folding line 564. Fourth intersection 543 is an intersection of second folding line 552, eleventh folding line 561, twelfth folding line 562, fifteenth folding line 565, and sixteenth folding line 566. Third intersection 542 and fourth intersection 543 are located at corner portions on the side of the other of the pair of short sides of bottom surface portion 500.

Second communication path 532 is located on a shortest reach path for electrolyte solution 80 reaching, from the outside of insulating sheet 50, an end portion of electrode assembly 20 closest to a ridgeline portion of exterior package 100 on the bottom portion 102 side and on the side of the other of the pair of second side walls 104a, 104b. In the present embodiment, second communication path 532 is located on a shortest reach path for the electrolyte solution reaching, from the outside of insulating sheet 50, the end portion of electrode assembly 20 closest to the ridgeline portion of exterior package 100 on the bottom portion 102 side and on the other second side wall 104b side.

First right-side piece portion 525, second right-side piece portion 526, right-side bottom piece portion 527, first right-side connection portion 528, second right-side connection portion 529, and tenth to sixteenth folding lines 560 to 566 in insulating sheet 50 have the same configuration as those of first left-side piece portion 520, second left-side piece portion 521, left-side bottom piece portion 522, first left-side connection portion 523, second left-side connection portion 524, and third to ninth folding lines 553 to 559 except for the above-described configurations.

In battery 1 according to the present embodiment, since first communication path 530 provided in insulating sheet 50 is located on the shortest reach path for electrolyte solution 80 reaching, from the outside of insulating sheet 50, the end portion of electrode assembly 20 closest to the ridgeline portion of exterior package 100 on the bottom portion 102 side and on the side of one of the pair of second side walls 104a, 104b, the creepage distance between the end portion of electrode assembly 20 and the ridgeline portion of exterior package 100 can be secured even when a high voltage is applied between the end portion of electrode assembly 20 and the ridgeline portion of exterior package 100, thereby suppressing occurrence of partial discharge between the end portion of electrode assembly 20 and the ridgeline portion of exterior package 100.

In battery 1 according to the present embodiment, since the shortest distance between bottom surface portion 500 and first open end 531 is more than or equal to 5 mm in the direction orthogonal to bottom surface portion 500, occurrence of partial discharge between end portion 20e of electrode assembly 20 and ridgeline portion 104e of exterior package 100 can be suppressed. It should be noted that the shortest distance is not limited to 5 mm, and is appropriately set in accordance with a necessary creepage distance corresponding to the voltage of battery 1 or the like.

In battery 1 according to the present embodiment, since the shortest distance between first region 311 and one second side wall 104a is shorter than the shortest distance between third region 313 and one second side wall 104a in the direction orthogonal to one second side wall 104a, a long insulation distance between electrode assembly 20 and exterior package 100 can be secured at a position close to the open end of box-shaped insulating sheet 50. By providing first region 411, third region 413, and other second side wall 104b with the same configurations as those of first region 311, third region 313, and one second side wall 104a, the same effect can be obtained.

In battery 1 according to the present embodiment, since tab portion 21 and positive electrode terminal 230 or the negative electrode terminal 280 are connected to each other using two members, i.e., first positive electrode current collector 300 and second positive electrode current collector 310 or first negative electrode current collector 400 and second negative electrode current collector 410, an electric connection path to electrode assembly 20 of battery case 10 can be readily constructed.

In battery 1 according to the present embodiment, since the plurality of wound type electrode assemblies are accommodated inside insulating sheet 50 disposed in battery case 10, the curvature radius of the end portion of electrode assembly 20 on the bottom surface portion 500 side can be made small as compared with a case where one thick wound type electrode assembly is accommodated, thereby securing a large region for allowing electrolyte solution 80 to reach electrode assembly 20. Thus, shortage of electrolyte solution 80 in electrode assembly 20 can be suppressed.

In battery 1 according to the present embodiment, since first side surface portion 510 and bottom surface portion 500 are connected to each other continuously across the entire length of one of the pair of long sides of bottom surface portion 500 of insulating sheet 50 and second side surface portion 511 and bottom surface portion 500 are connected to each other continuously across the entire length of the other of the pair of long sides of bottom surface portion 500, electrode assembly 20 and exterior package 100 are continuously insulated from each other at each of first folding line 551 and second folding line 552, thereby suppressing occurrence of partial discharge.

In battery 1 according to the present embodiment, since bottom surface portion 500 and left-side bottom piece portion 522 are connected to each other continuously across the entire length of one of the pair of short sides of bottom surface portion 500 of insulating sheet 50, electrode assembly 20 and exterior package 100 are continuously insulated from each other at fourth folding line 554, thereby suppressing occurrence of partial discharge.

In battery 1 according to the present embodiment, since first side surface portion 510 and first left-side piece portion 520 are connected to each other continuously across the entire length of the range, facing electrode assembly 20, of the boundary between first side surface portion 510 and first left-side piece portion 520 of insulating sheet 50 and second side surface portion 511 and second left-side piece portion 521 are connected to each other continuously across the entire length of the range, facing electrode assembly 20, of the boundary between second side surface portion 511 and second left-side piece portion 521, electrode assembly 20 and exterior package 100 are continuously insulated from each other at each of third folding line 553 and fifth folding line 555, thereby suppressing occurrence of partial discharge.

In battery 1 according to the present embodiment, since each of first folding line 551, second folding line 552, third folding line 553, fourth folding line 554, fifth folding line 555, seventh folding line 557, and eighth folding line 558 is formed by depressing insulating sheet 50 from one surface side of insulating sheet 50 and each of sixth folding line 556 and ninth folding line 559 is formed by depressing insulating sheet 50 from the other surface side of insulating sheet 50, the depressed side can be the valley side of the fold and therefore insulating sheet 50 can be readily folded into a box shape.

In battery 1 according to the present embodiment, since second communication path 532 provided in folded insulating sheet 50 is located on the shortest reach path for electrolyte solution 80 reaching, from the outside of insulating sheet 50, the end portion of electrode assembly 20 closest to the ridgeline portion of exterior package 100 on the bottom portion 102 side and on the side of the other of the pair of second side walls 104a, 104b, the creepage distance between the end portion of electrode assembly 20 and the ridgeline portion of exterior package 100 can be secured, thereby suppressing occurrence of partial discharge between the end portion of electrode assembly 20 and the ridgeline portion of exterior package 100.

Second Embodiment

Hereinafter, a battery according to a second embodiment of the present technology will be described. Since the battery according to the second embodiment of the present technology is different from battery 1 according to the first embodiment of the present technology in terms of the configuration of the insulating sheet, the same configurations as those in battery 1 according to the first embodiment of the present technology will not be described repeatedly.

Figure 25:
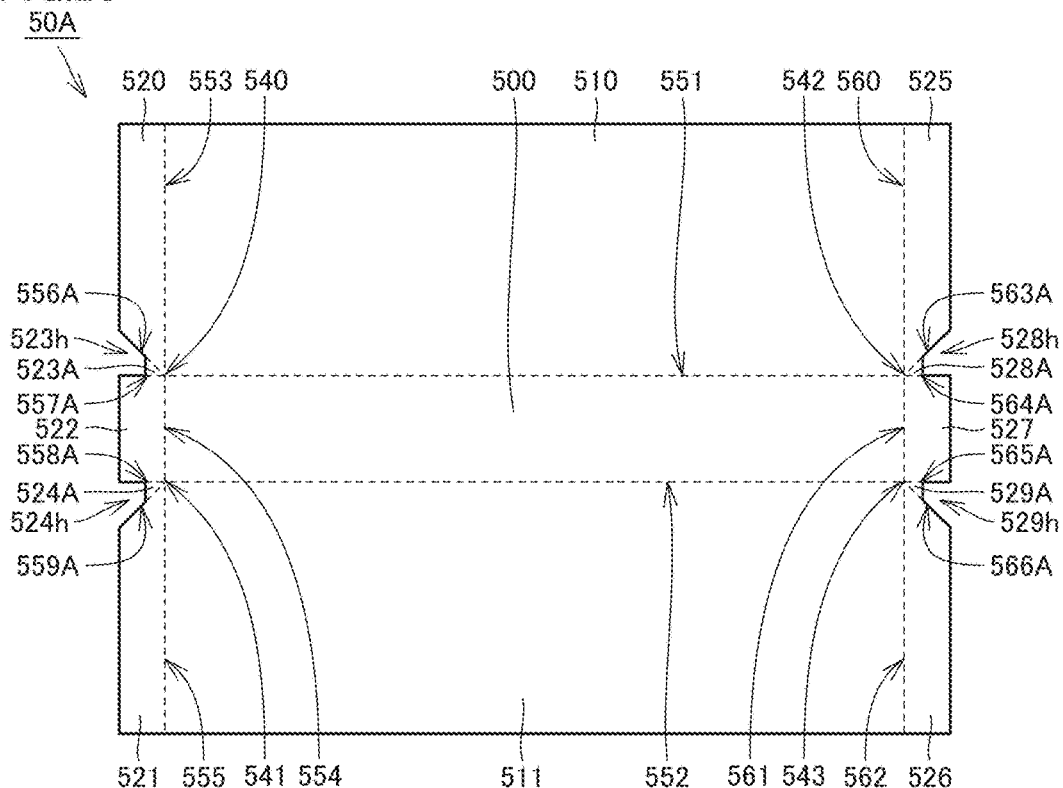
FIG. 25 is an expanded view showing a configuration of an insulating sheet included in a battery according to a second embodiment of the present technology.

FIG. 25 is an expanded view showing the configuration of the insulating sheet included in the battery according to the second embodiment of the present technology. As shown in FIG. 25, insulating sheet 50A included in the battery according to the present embodiment includes a bottom surface portion 500, a first side surface portion 510, a second side surface portion 511, a first left-side piece portion 520, a second left-side piece portion 521, a left-side bottom piece portion 522, a first left-side connection portion 523A, and a second left-side connection portion 524A.

First left-side connection portion 523A is provided continuous to each of first left-side piece portion 520 and left-side bottom piece portion 522. Second left-side connection portion 524A is provided continuous to each of second left-side piece portion 521 and left-side bottom piece portion 522.

Insulating sheet 50A is provided with a first folding line 551, a second folding line 552, a third folding line 553, a fourth folding line 554, a fifth folding line 555, a sixth folding line 556A, a seventh folding line 557A, an eighth folding line 558A, and a ninth folding line 559A.

Sixth folding line 556A is formed at a boundary between first left-side piece portion 520 and first left-side connection portion 523A. Sixth folding line 556A includes a short side portion of first left-side piece portion 520 on the first left-side connection portion 523A side.

Seventh folding line 557A is formed at a boundary between left-side bottom piece portion 522 and first left-side connection portion 523A. Seventh folding line 557A includes a short side portion of left-side bottom piece portion 522 on the first left-side connection portion 523A side.

Eighth folding line 558A is formed at a boundary between left-side bottom piece portion 522 and second left-side connection portion 524A. Eighth folding line 558A includes a short side portion of left-side bottom piece portion 522 on the second left-side connection portion 524A side.

Ninth folding line 559A is formed at a boundary between second left-side piece portion 521 and second left-side connection portion 524A. Ninth folding line 559A includes a short side portion of second left-side piece portion 521 on the second left-side connection portion 524A side.

In insulating sheet 50A, a first through-cut portion 523h is formed in a region that is interposed between sixth folding line 556A and seventh folding line 557A and that is adjacent to first left-side connection portion 523A. A second through-cut portion 524h is formed in a region that is interposed between eighth folding line 558 and ninth folding line 559 and that is adjacent to second left-side connection portion 524A. It should be noted that each of first through-cut portion 523h and second through-cut portion 524h is not limited to the cut-out shape, and may have a structure by which the inside and outside of insulating sheet 50 can communicate with each other, such as a slit, a through hole, or a perforation.

Each of first folding line 551, second folding line 552, third folding line 553, fourth folding line 554, fifth folding line 555, seventh folding line 557A, and eighth folding line 558A is formed by depressing insulating sheet 50 from one surface side of insulating sheet 50. Each of sixth folding line 556A and ninth folding line 559A is formed by depressing insulating sheet 50 from the other surface side of insulating sheet 50. Thus, left-side bottom piece portion 522 can be disposed on an outer side with respect to first left-side piece portion 520 and second left-side piece portion 521.

Figure 26:
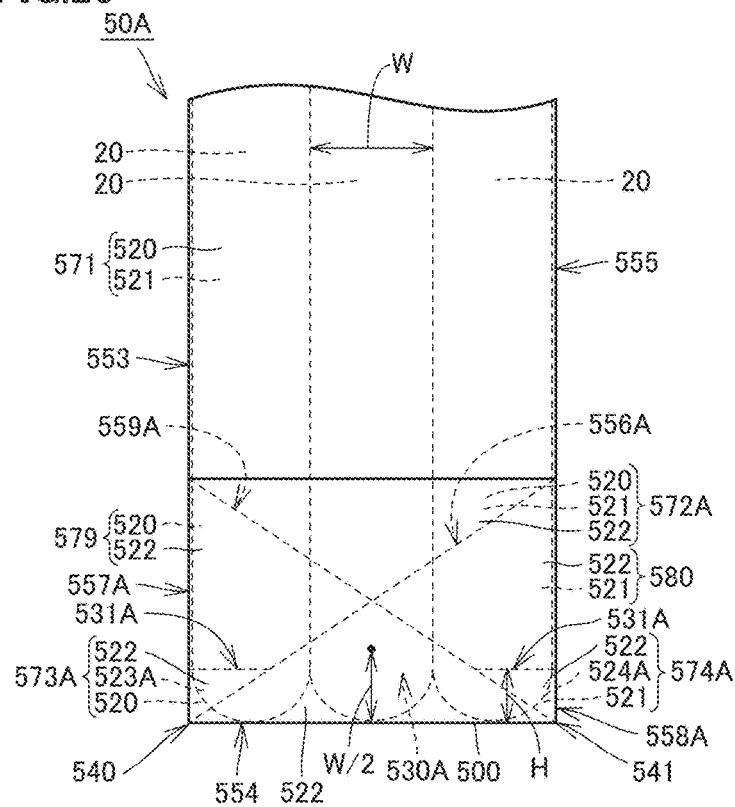
FIG. 26 is a side view showing an inner configuration of the battery according to the second embodiment of the present technology.

FIG. 26 is a side view showing an inner configuration of the battery according to the second embodiment of the present technology. As shown in FIG. 26, first left-side connection portion 523A is folded at a boundary between first left-side connection portion 523A and each of first left-side piece portion 520 and left-side bottom piece portion 522, and is interposed between first left-side piece portion 520 and left-side bottom piece portion 522. Second left-side connection portion 524A is folded at a boundary between second left-side connection portion 524A and each of second left-side piece portion 521 and left-side bottom piece portion 522, and is interposed between second left-side piece portion 521 and left-side bottom piece portion 522.

A first communication path 530A is formed in insulating sheet 50A to communicate inside and outside of insulating sheet 50A. First communication path 530A is constituted of first left-side piece portion 520, second left-side piece portion 521, left-side bottom piece portion 522, first left-side connection portion 523A, and second left-side connection portion 524A. First communication path 530A is a clearance formed by folding first left-side piece portion 520, second left-side piece portion 521, left-side bottom piece portion 522, first left-side connection portion 523A, and second left-side connection portion 524A to position them adjacent to one another, and an electrolyte solution can flow through first communication path 530A between the inside and outside of insulating sheet 50A.

First communication path 530A has a first open end 531A. First open end 531A is located in first communication path 530A at an end of each of first left-side connection portion 523A and second left-side connection portion 524A on the opening 101 side of exterior package 100.

Insulating sheet 50A further includes a first overlapping region 571, a second overlapping region 572A, a third overlapping region 573A, a fourth overlapping region 574A, a ninth overlapping region 579, and a tenth overlapping region 580.

First overlapping region 571 is a region in which first left-side piece portion 520 and second left-side piece portion 521 overlap with each other. Second overlapping region 572A is a region in which first left-side piece portion 520, second left-side piece portion 521, and left-side bottom piece portion 522 overlap with one another. Third overlapping region 573 is a region in which first left-side piece portion 520, left-side bottom piece portion 522, and first left-side connection portion 523A overlap with one another. Fourth overlapping region 574 is a region in which second left-side piece portion 521, left-side bottom piece portion 522, and second left-side connection portion 524A overlap with one another.

Ninth overlapping region 579 is a region in which first left-side piece portion 520 and left-side bottom piece portion 522 overlap with each other. Tenth overlapping region 580 is a region in which second left-side piece portion 521 and left-side bottom piece portion 522 overlap with each other.

First open end 531A is located at a position of an end of each of third overlapping region 573A and fourth overlapping region 574A on the opening 101 side of exterior package 100. As shown in FIG. 26, first open end 531A in the present embodiment is located on the bottom surface portion 500 side with respect to the position at which sixth folding line 556A and ninth folding line 559A intersect each other.

A relation of H<W/2 is satisfied, where W represents a width dimension of electrode assembly 20 in the direction in which the pair of first side walls 103a, 103b face each other, and H represents a height dimension from bottom surface portion 500 to first open end 531A in the direction orthogonal to bottom surface portion 500. Due to this relation, first open end 531A is close to the end portion of electrode assembly 20 on the bottom surface portion 500 side.

It should be noted that first right-side piece portion 525, second right-side piece portion 526, right-side bottom piece portion 527, first right-side connection portion 528A, second right-side connection portion 529A, tenth to twelfth folding lines 560 to 562, and thirteenth to sixteenth folding lines 563A to 566A in insulating sheet 50A of the present embodiment have the same configurations as those of first left-side piece portion 520, second left-side piece portion 521, left-side bottom piece portion 522, first left-side connection portion 523A, second left-side connection portion 524A, third to fifth folding lines 553 to 555, and sixth to ninth folding lines 556A to 599A.

In the battery according to the present embodiment, since first through-cut portion 523h and second through-cut portion 524h are formed in insulating sheet 50A, first open end 531A of first communication path 530A is located at a position close to bottom surface portion 500 in the direction orthogonal to bottom surface portion 500 as compared with the case where first through-cut portion 523h and second through-cut portion 524h are not formed, the electrolyte solution can be facilitated to reach the inside of insulating sheet 50 from the outside of insulating sheet 50 while suppressing occurrence of partial discharge between end portion 20e of electrode assembly 20 and ridgeline portion 104e of exterior package 100.

In battery 1 according to the present embodiment, since the relation of H<W/2 is satisfied where W represents the width dimension of electrode assembly 20 in the direction in which the pair of first side walls 103a, 103b face each other and H represents the height dimension from bottom surface portion 500 to first open end 531A in the direction orthogonal to bottom surface portion 500, first open end 531A can be close to the end portion of electrode assembly 20 on the bottom surface portion 500 side, with the result that the electrolyte solution can reach the inside of insulating sheet 50 even when an amount of electrolyte solution outside insulating sheet 50 is small. It should be noted that also in the present embodiment, the shortest distance between bottom surface portion 500 and first open end 531A is preferably more than or equal to 5 mm in the direction orthogonal to bottom surface portion 500.

Although the embodiments of the present invention have been described and illustrated in detail, it is clearly understood that the same is by way of illustration and example only and is not to be taken by way of limitation, the scope of the present invention being interpreted by the terms of the appended claims.

What is claimed is:

1. A battery, comprising:
   an electrode assembly having a positive electrode plate and a negative electrode plate;
   an exterior package composed of a metal, the exterior package being provided with an opening through which the electrode assembly is insertable, the exterior package accommodating the electrode assembly and an electrolyte solution;
   a sealing plate that seals the opening; and
   one insulating sheet disposed between the electrode assembly and the exterior package, wherein
   the exterior package has
      a bottom portion facing the opening,
      a pair of first side walls provided to extend from edges of the bottom portion and face each other, and
      a pair of second side walls provided to extend from edges of the bottom portion and face each other so as to connect between the pair of first side walls,
   the one insulating sheet includes
      a bottom surface portion facing the bottom portion,
      a first side surface portion disposed between one of the pair of first side walls and the electrode assembly,
      a second side surface portion disposed between the other of the pair of first side walls and the electrode assembly,
      a first left-side piece portion folded from an end portion of one side of the first side surface portion and disposed between one of the pair of second side walls and the electrode assembly,
      a second left-side piece portion folded from an end portion of one side of the second side surface portion and disposed between the one of the pair of second side walls and the electrode assembly to have at least a portion overlapping with the first left-side piece portion,
      a left-side bottom piece portion extending from an end portion of one side of the bottom surface portion, the left-side bottom piece portion being located between the one of the pair of second side walls and the electrode assembly and on an outer side with respect to the first left-side piece portion and the second left-side piece portion overlapping with each other,
      a first left-side connection portion provided continuous to each of the first left-side piece portion and the left-side bottom piece portion, the first left-side connection portion being folded at a boundary between the first left-side connection portion and each of the first left-side piece portion and the left-side bottom piece portion, the first left-side connection portion being interposed between the first left-side piece portion and the left-side bottom piece portion, and
      a second left-side connection portion provided continuous to each of the second left-side piece portion and the left-side bottom piece portion, the second left-side connection portion being folded at a boundary between the second left-side connection portion and each of the second left-side piece portion and the left-side bottom piece portion, the second left-side connection portion being interposed between the second left-side piece portion and the left-side bottom piece portion,
   the first left-side piece portion, the second left-side piece portion, the left-side bottom piece portion, the first left-side connection portion, and the second left-side connection portion form a first communication path for communicating inside and outside of the one insulating sheet, the first communication path having a first open end at a position of an end of each of the first left-side connection portion and the second left-side connection portion on the opening side of the exterior package, and
   the first communication path is located on a shortest reach path for the electrolyte solution reaching, from the outside of the one insulating sheet, an end portion of the electrode assembly closest to a ridgeline portion of the exterior package on the bottom portion side and on the side of the one of the pair of second side walls
   the battery further comprises:

a tab portion provided on at least one of the positive electrode plate and the negative electrode plate, the tab portion extending on a side of the electrode assembly; and a current collector connected to the tab portion, and arranged between the side of the electrode assembly and the one of the pair of second side walls, wherein the current collector has a first region facing a second side wall of the pair of second side walls, a second region located on the sealing plate side with respect to the first region, and a third region located on the sealing plate side with respect to the second region and facing the second side wall, the tab portion is connected to the first region, and a shortest distance between the first region of the current collector and the second side wall is shorter than a shortest distance between the third region of the current collector and the second side wall in a direction orthogonal to the second side wall, the current collector and the second side wall facing each other.

2. The battery according to claim 1, wherein
the one insulating sheet is folded into a tubular shape with a bottom,
the bottom surface portion has a quadrangular shape having a pair of long sides and a pair of short sides orthogonal to the pair of long sides,
the first side surface portion is connected to one of the pair of long sides of the bottom surface portion, and a first folding line is formed at a boundary between the bottom surface portion and the first side surface portion,
the second side surface portion is connected to the other of the pair of long sides of the bottom surface portion, and a second folding line is formed at a boundary between the bottom surface portion and the second side surface portion,
a third folding line is formed at a boundary between the first side surface portion and the first left-side piece portion,
a fourth folding line is formed at a boundary between one of the pair of short sides of the bottom surface portion and the left-side bottom piece portion,
a fifth folding line is formed at a boundary between the second side surface portion and the second left-side piece portion,
a sixth folding line is formed at a boundary between the first left-side piece portion and the first left-side connection portion,
a seventh folding line is formed at a boundary between the left-side bottom piece portion and the first left-side connection portion,
an eighth folding line is formed at a boundary between the left-side bottom piece portion and the second left-side connection portion,
a ninth folding line is formed at a boundary between the second left-side piece portion and the second left-side connection portion,
the one insulating sheet has a first overlapping region, a second overlapping region, a third overlapping region, and a fourth overlapping region between the one of the pair of second side walls and the electrode assembly,
the first overlapping region being a region in which the first left-side piece portion and the second left-side piece portion overlap with each other,
the second overlapping region being a region in which the first left-side piece portion, the second left-side piece portion, and the left-side bottom piece portion overlap with one another,
the third overlapping region being a region in which the first left-side piece portion, the left-side bottom piece portion, and the first left-side connection portion overlap with one another, and
the fourth overlapping region being a region in which the second left-side piece portion, the left-side bottom piece portion, and the second left-side connection portion overlap with one another, and
the first open end is located at a position of an end of each of the third overlapping region and the fourth overlapping region on the opening side of the exterior package.

3. The battery according to claim 2, wherein
a shortest distance between the bottom surface portion and the first open end is more than or equal to 5 mm in a direction orthogonal to the bottom surface portion.

4. The battery according to claim 3, wherein
in the one insulating sheet,
a first through-cut portion is formed in a region that is interposed between the sixth folding line and the seventh folding line and that is adjacent to the first left-side connection portion, and
a second through-cut portion is formed in a region that is interposed between the eighth folding line and the ninth folding line and that is adjacent to the second left-side connection portion.

5. The battery according to claim 4, wherein
the electrode assembly is a wound type electrode assembly in which the positive electrode plate and the negative electrode plate are wound, and
a relation of $H<W/2$ is satisfied, where
W represents a width dimension of the electrode assembly in a direction in which the pair of first side walls face each other, and
H represents a height dimension from the bottom surface portion to the first open end in the direction orthogonal to the bottom surface portion.

6. The battery according to claim 5, wherein
a plurality of wound type electrode assemblies including the wound type electrode assembly is accommodated inside the one insulating sheet disposed in the exterior package.

7. The battery according to claim 2, wherein
the first side surface portion and the bottom surface portion are connected to each other continuously across an entire length of one of the pair of long sides of the bottom surface portion, and
the second side surface portion and the bottom surface portion are connected to each other continuously across an entire length of the other of the pair of long sides of the bottom surface portion.

8. The battery according to claim 2, wherein
the bottom surface portion and the left-side bottom piece portion are connected to each other continuously across an entire length of one of the pair of short sides of the bottom surface portion.

9. The battery according to claim 2, wherein
the first side surface portion and the first left-side piece portion are connected to each other continuously across an entire length of a range, facing the electrode assembly, of a boundary between the first side surface portion and the first left-side piece portion, and
the second side surface portion and the second left-side piece portion are connected to each other continuously across an entire length of a range, facing the electrode assembly, of a boundary between the second side surface portion and the second left-side piece portion.

10. The battery according to claim 2, wherein each of the first folding line, the second folding line, the third folding line, the fourth folding line, the fifth folding line, the seventh folding line, and the eighth folding line is formed by depressing the one insulating sheet from a one surface side of the one insulating sheet, and
each of the sixth folding line and the ninth folding line is formed by depressing the one insulating sheet from the other surface side of the one insulating sheet.

11. The battery according to claim 2, wherein the one insulating sheet includes:
    a first right-side piece portion folded from an end portion of the other side of the first side surface portion, the first right-side piece portion being disposed between the other of the pair of second side walls and the electrode assembly,
    a second right-side piece portion folded from an end portion of the other side of the second side surface portion, the second right-side piece portion being disposed between the other of the pair of second side walls and the electrode assembly to have at least a portion overlapping with the first right-side piece portion,
    a right-side bottom piece portion extending from an end portion of the other side of the bottom surface portion, the right-side bottom piece portion being located on an outer side with respect to the first right-side piece portion and the second right-side piece portion overlapping with each other between the other of the pair of second side walls and the electrode assembly,
    a first right-side connection portion provided continuous to each of the first right-side piece portion and the right-side bottom piece portion,
        the first right-side connection portion being folded at a boundary between the first right-side connection portion and each of the first right-side piece portion and the right-side bottom piece portion, and
        the first right-side connection portion being interposed between the first right-side piece portion and the right-side bottom piece portion, and
    a second right-side connection portion provided continuous to each of the second right-side piece portion and the right-side bottom piece portion,
        the second right-side connection portion being folded at a boundary between the second right-side connection portion and each of the second right-side piece portion and the right-side bottom piece portion, and
        the second right-side connection portion being interposed between the second right-side piece portion and the right-side bottom piece portion,
    the first right-side piece portion, the second right-side piece portion, the right-side bottom piece portion, the first right-side connection portion, and the second right-side connection portion form a second communication path for communicating inside and outside of the one insulating sheet, the second communication path having a second open end at a position of an end of each of the first right-side connection portion and the second right-side connection portion on the opening side of the exterior package, and the second communication path is located on a shortest reach path for the electrolyte solution reaching, from the outside of the one insulating sheet, an end portion of the electrode assembly closest to a ridgeline portion of the exterior package on the bottom portion side and on the side of the other of the pair of second side walls.

12. The battery according to claim 11, wherein
a tenth folding line is formed at a boundary between the first side surface portion and the first right-side piece portion,
an eleventh folding line is formed at a boundary between the other of the pair of short sides of the bottom surface portion and the right-side bottom piece portion,
a twelfth folding line is formed at a boundary between the second side surface portion and the second right-side piece portion,
a thirteenth folding line is formed at a boundary between the first right-side piece portion and the first right-side connection portion,
a fourteenth folding line is formed at a boundary between the right-side bottom piece portion and the first right-side connection portion,
a fifteenth folding line is formed at a boundary between the right-side bottom piece portion and the second right-side connection portion,
a sixteenth folding line is formed at a boundary between the second right-side piece portion and the second right-side connection portion,
the one insulating sheet has a fifth overlapping region, a sixth overlapping region, a seventh overlapping region, and an eighth overlapping region between the other of the pair of second side walls and the electrode assembly,
    the fifth overlapping region being a region in which the first right-side piece portion and the second right-side piece portion overlap with each other,
    the sixth overlapping region being a region in which the first right-side piece portion, the second right-side piece portion, and the right-side bottom piece portion overlap with one another,
    the seventh overlapping region being a region in which the first right-side piece portion, the right-side bottom piece portion, and the first right-side connection portion overlap with one another, and
    the eighth overlapping region being a region in which the second right-side piece portion, the right-side bottom piece portion, and the second right-side connection portion overlap with one another, and
the second open end is located at a position of an end of each of the seventh overlapping region and the eighth overlapping region on the opening side of the exterior package.

13. The battery according to claim 2, wherein a first through cut portion is formed in a region that is adjacent to the first left side connection portion and that is apart from an intersection of the first folding line and the fourth folding line.

14. The battery according to claim 2, wherein a first through-cut portion is formed in a region that is adjacent to the first left-side connection portion so that a width of the first through-cut portion increases as a distance from the bottom surface portion toward the outside of the one insulating sheet increases.

15. The battery according to claim 1, further comprising:
an extension current collector connected to the current collector, wherein the extension current collector has a base portion and a current collector connection portion, the base portion being disposed between the electrode assembly and the sealing plate, and the current collector connection portion extending from an end of the base portion toward the bottom portion, and the current collector connection portion is connected to the third region.

16. The battery according to claim 1, wherein an area of each of the pair of first side walls is larger than an area of each of the pair of second side walls.

17. The battery according to claim 1, wherein the current collector and the tab portion are separate components from each other.

18. The battery according to claim 1, wherein the current collector is welded to the tab portion.

\* \* \* \* \*